(12) United States Patent  
Cooper et al.

(10) Patent No.: US 12,099,475 B2
(45) Date of Patent: Sep. 24, 2024

(54) SYSTEM AND METHOD FOR RANDOM-ACCESS MANIPULATION OF COMPACTED DATA FILES

(71) Applicant: AtomBeam Technologies Inc., Moraga, CA (US)

(72) Inventors: Joshua Cooper, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/412,439

(22) Filed: Jan. 12, 2024

(65) Prior Publication Data

US 2024/0202163 A1 Jun. 20, 2024

Related U.S. Application Data

(63) Continuation-in-part of application No. 18/078,909, filed on Dec. 9, 2022, now Pat. No. 11,899,624, which is a continuation of application No. 17/734,052, filed on Apr. 30, 2022, now Pat. No. 11,609,882, which is a continuation of application No. 17/180,439, filed on Feb. 19, 2021, now Pat. No. 11,366,790, which is a continuation-in-part of application No. 16/923,039, filed on Jul. 7, 2020, now Pat. No. 11,232,076, which is a continuation-in-part
(Continued)

(51) Int. Cl.
*G06F 16/174* (2019.01)
*G06F 3/06* (2006.01)

(52) U.S. Cl.
CPC ........ *G06F 16/1752* (2019.01); *G06F 3/0608* (2013.01); *G06F 3/0641* (2013.01); *G06F 3/067* (2013.01)

(58) Field of Classification Search
None
See application file for complete search history.

(56) References Cited

U.S. PATENT DOCUMENTS 5,408,234 A 4/1995 Chu
7,154,416 B1 * 12/2006 Savage .................. H03M 7/30
711/212

(Continued)

*Primary Examiner* — Michael Alsip
(74) *Attorney, Agent, or Firm* — Galvin Patent Law LLC; Brian R. Galvin

(57) ABSTRACT

A system and method for random-access manipulation of compacted data files, utilizing a reference codebook, a random-access engine, a data deconstruction engine, and a data deconstruction engine. The system may receive a data query pertaining to a data read or data write request, wherein the data file to be read from or written to is a compacted data file. A random-access engine may facilitate data manipulation processes by transforming the codebook into a hierarchical representation and then traversing the representation scanning for specific codewords associated with a data query request. In an embodiment, an estimator module is present and configured to utilize cardinality estimation to determine a starting codeword to begin searching the compacted data file for the data associated with the data query. The random-access engine may encode the data to be written, insert the encoded data into a compacted data file, and update the codebook as needed.

7 Claims, 37 Drawing Sheets

Related U.S. Application Data of application No. 16/716,098, filed on Dec. 16, 2019, now Pat. No. 10,706,018, which is a continuation of application No. 16/455,655, filed on Jun. 27, 2019, now Pat. No. 10,509,771, which is a continuation-in-part of application No. 16/200,466, filed on Nov. 26, 2018, now Pat. No. 10,476,519, which is a continuation-in-part of application No. 15/975,741, filed on May 9, 2018, now Pat. No. 10,303,391.

(60) Provisional application No. 63/140,111, filed on Jan. 21, 2021, provisional application No. 63/027,166, filed on May 19, 2020, provisional application No. 62/926,723, filed on Oct. 28, 2019, provisional application No. 62/578,824, filed on Oct. 30, 2017.

(56) References Cited

U.S. PATENT DOCUMENTS

| | | |
|---|---|---|
| 8,453,040 B2 | 5/2013 | Henderson, Jr. et al. |
| 9,294,589 B2 | 3/2016 | Crosta et al. |
| 9,727,255 B2 | 8/2017 | Matsushita |
| 10,255,315 B2 | 4/2019 | Kalevo et al. |
| 2016/0196075 A1 | 7/2016 | Matsushita |

* cited by examiner

SYSTEM AND METHOD FOR RANDOM-ACCESS MANIPULATION OF COMPACTED DATA FILES

CROSS-REFERENCE TO RELATED APPLICATIONS

Priority is claimed in the application data sheet to the following patents or patent applications, each of which is expressly incorporated herein by reference in its entirety:
Ser. No. 18/078,909
Ser. No. 17/734,052
Ser. No. 17/180,439
63/140,111
Ser. No. 16/923,039
63/027,166
Ser. No. 16/716,098
Ser. No. 16/455,655
Ser. No. 16/200,466
Ser. No. 15/975,741
62/578,824
62/926,723

BACKGROUND OF THE INVENTION

Field of the Invention

The present invention is in the field of computer data storage and transmission, and in particular to the manipulation of compacted data.

Discussion of the State of the Art

As computers become an ever-greater part of our lives, and especially in the past few years, data storage has become a limiting factor worldwide. Prior to about 2010, the growth of data storage far exceeded the growth in storage demand. In fact, it was commonly considered at that time that storage was not an issue, and perhaps never would be, again. In 2010, however, with the growth of social media, cloud data centers, high tech and biotech industries, global digital data storage accelerated exponentially, and demand hit the zettabyte (1 trillion gigabytes) level. Current estimates are that data storage demand will reach 50 zettabytes by 2020. By contrast, digital storage device manufacturers produced roughly 1 zettabyte of physical storage capacity globally in 2016. We are producing data at a much faster rate than we are producing the capacity to store it. In short, we are running out of room to store data, and need a breakthrough in data storage technology to keep up with demand.

The primary solutions available at the moment are the addition of additional physical storage capacity and data compression. As noted above, the addition of physical storage will not solve the problem, as storage demand has already outstripped global manufacturing capacity. Data compression is also not a solution. A rough average compression ratio for mixed data types is 2:1, representing a doubling of storage capacity. However, as the mix of global data storage trends toward multi-media data (audio, video, and images), the space savings yielded by compression either decreases substantially, as is the case with lossless compression which allows for retention of all original data in the set, or results in degradation of data, as is the case with lossy compression which selectively discards data in order to increase compression. Even assuming a doubling of storage capacity, data compression cannot solve the global data storage problem. The method disclosed herein, on the other hand, works the same way with any type of data.

Transmission bandwidth is also increasingly becoming a bottleneck. Large data sets require tremendous bandwidth, and we are transmitting more and more data every year between large data centers. On the small end of the scale, we are adding billions of low bandwidth devices to the global network, and data transmission limitations impose constraints on the development of networked computing applications, such as the "Internet of Things".

Furthermore, as quantum computing becomes more and more imminent, the security of data, both stored data and data streaming from one point to another via networks, becomes a critical concern as existing encryption technologies are placed at risk.

A problem with compacted data, however, is that it cannot be accessed randomly. Random access to compacted data results in invalid data, so compacted data must be uncompacted before it becomes usable.

What is needed is a system and method for providing random-access manipulation of compacted data, which facilitates searching, reading of, and writing to compacted data files.

SUMMARY OF THE INVENTION

A system and method for random-access manipulation of compacted data files, utilizing a reference codebook, a random-access engine, a data deconstruction engine, and a data deconstruction engine. The system may receive a data query pertaining to a data read or data write request, wherein the data file to be read from or written to is a compacted data file. A random-access engine may facilitate data manipulation processes by transforming the codebook into a hierarchical representation and then traversing the representation scanning for specific codewords associated with a data query request. In an embodiment, an estimator module is present and configured to utilize cardinality estimation to determine a starting codeword to begin searching the compacted data file for the data associated with the data query. The random-access engine may encode the data to be written, insert the encoded data into a compacted data file, and update the codebook as needed.

According to a preferred embodiment, a system for random-access manipulation of a compacted data file is disclosed, comprising: a computing device comprising a memory, a processor, and a non-volatile data storage device; the random access engine comprising a first plurality of programming instructions stored in the memory and operating on the processor, wherein the first plurality of programming instructions, when operating on the processor, cause the computing device to: receive a data search query, the data search query being directed to the compacted data file, wherein the compacted file is compacted using a reference codebook; organize the reference codebook into a hierarchical representation; traverse the hierarchical representation until a start codeword corresponding to the beginning of the data search query is identified; and send the start codeword and a plurality of immediately following codewords from the compacted data file to a decoder.

According to another preferred embodiment, a method for random-access manipulation of a compacted data file is disclosed, comprising the steps of: receiving a data search query, the data search query being directed to the compacted data file, wherein the compacted file is compacted using a reference codebook; organizing the reference codebook into a hierarchical representation; traversing the hierarchical representation until a start codeword corresponding to the beginning of the data search query is identified; and sending the start codeword and a plurality of immediately following codewords from the compacted data file to a decoder According to one aspect, a deconstruction engine comprising a second plurality of programming instructions stored in the memory and operable on the processor, wherein the second plurality of programming instructions, when operating on the processor, cause the computing device to: deconstruct a data stream into a plurality of data sourceblocks; create the compacted data file by compacting the plurality of data sourceblocks using the reference codebook; and send the reference codebook to the random access engine According to one aspect, the system further comprises an estimator module comprising a third plurality of programming instructions stored in the memory and operable on the processor, wherein the third plurality of programming instructions, when operating on the processor, cause the computing device to: estimate a first starting bit location in the compacted data file; refine the first starting bit location by: determining a plurality of codeword boundaries by performing distinct value estimation on the compacted data file, wherein the distinct value estimates correspond to a codeword boundary; and determining whether a bit sequence starting at the first starting bit location corresponds to a codeword boundary of the plurality of codeword boundaries and, if not, traversing the hierarchical representation until a codeword boundary is located at a new starting bit.

According to one aspect, the estimator module sends the codeword boundary estimate to the random access engine.

According to one aspect, the random access engine uses the codeword boundary estimate as an initial point to begin traversing the hierarchical representation.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
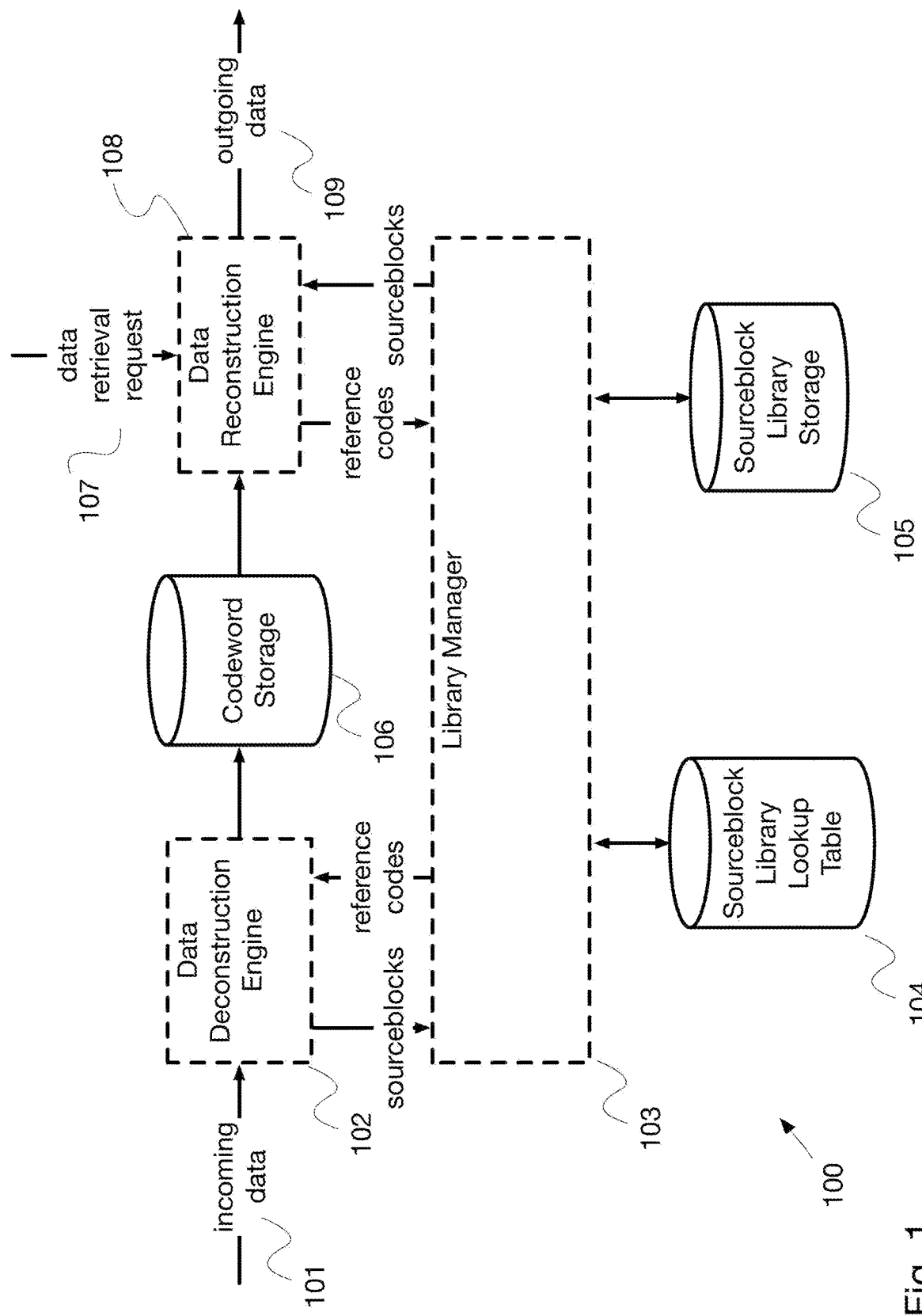
FIG. 1 is a diagram showing an embodiment of the system in which all components of the system are operated locally.

A system and method for random-access manipulation of compacted data files, utilizing a reference codebook, a random-access engine, a data deconstruction engine, and a data deconstruction engine. The system may receive a data query pertaining to a data read or data write request, wherein the data file to be read from or written to is a compacted data file. A random-access engine may facilitate data manipulation processes by transforming the codebook into a hierarchical representation and then traversing the representation scanning for specific codewords associated with a data query request. In an embodiment, an estimator module is present and configured to utilize cardinality estimation to determine a starting codeword to begin searching the compacted data file for the data associated with the data query. The random-access engine may encode the data to be written, insert the encoded data into a compacted data file, and update the codebook as needed.

A data search query may be generated by a system user. The data search query may include a search term, an identified compacted data file to read from, and a location hint. For instance, a user may search for a string in a text file and specify the location in the original file where the user thinks the string may be located. For example, a user data read query may be of the form: "search for the word 'cosmology' starting at the 50% mark of compacted version of an astrophysics textbook". The system may use the location hint "50% mark" as a starting point for conducting a search of the encoded version of "cosmology" within the compacted version. The location hint may reference any point in the original data file, and the system may access the compacted data file at a point at or near the reference point contained within the location hint. In this way, any bit contained within a compacted data file may be randomly-accessed directly without the need to scan through or decode the entire compacted file. When the correct encodings are found, the reference codes are retrieved and a reference codebook may be used to transform the encoded version back to the original data, and the data may be sent to the user for verification.

Additionally, the system may support data write functions. A data write process begins when the system receives a data write query which may contain data the be inserted (write term) and a compacted data file to be written to. The system may re-encode the entire original data file with the inclusion of the inserted data. In other embodiments, an opcode representing an offset may be generated to facilitate a data write function that does not require re-encoding the entire data file, or unused bits located within the codebook can be used to create secondary encodings, which also does not require re-encoding the entire data file.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "sourceblock" refers to a series of bits of a specified length. The number of bits in a sourceblock may be dynamically optimized by the system during operation. In one aspect, a sourceblock may be of the same length as the block size used by a particular file system, typically 512 bytes or 4,096 bytes.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "data set" refers to a grouping of data for a particular purpose. One example of a data set might be a word processing file containing text and formatting information.

The term "library" refers to a database containing sourceblocks each with a pattern of bits and reference code unique within that library. The term "codebook" is synonymous with the term library.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

Conceptual Architecture

Figure 29:
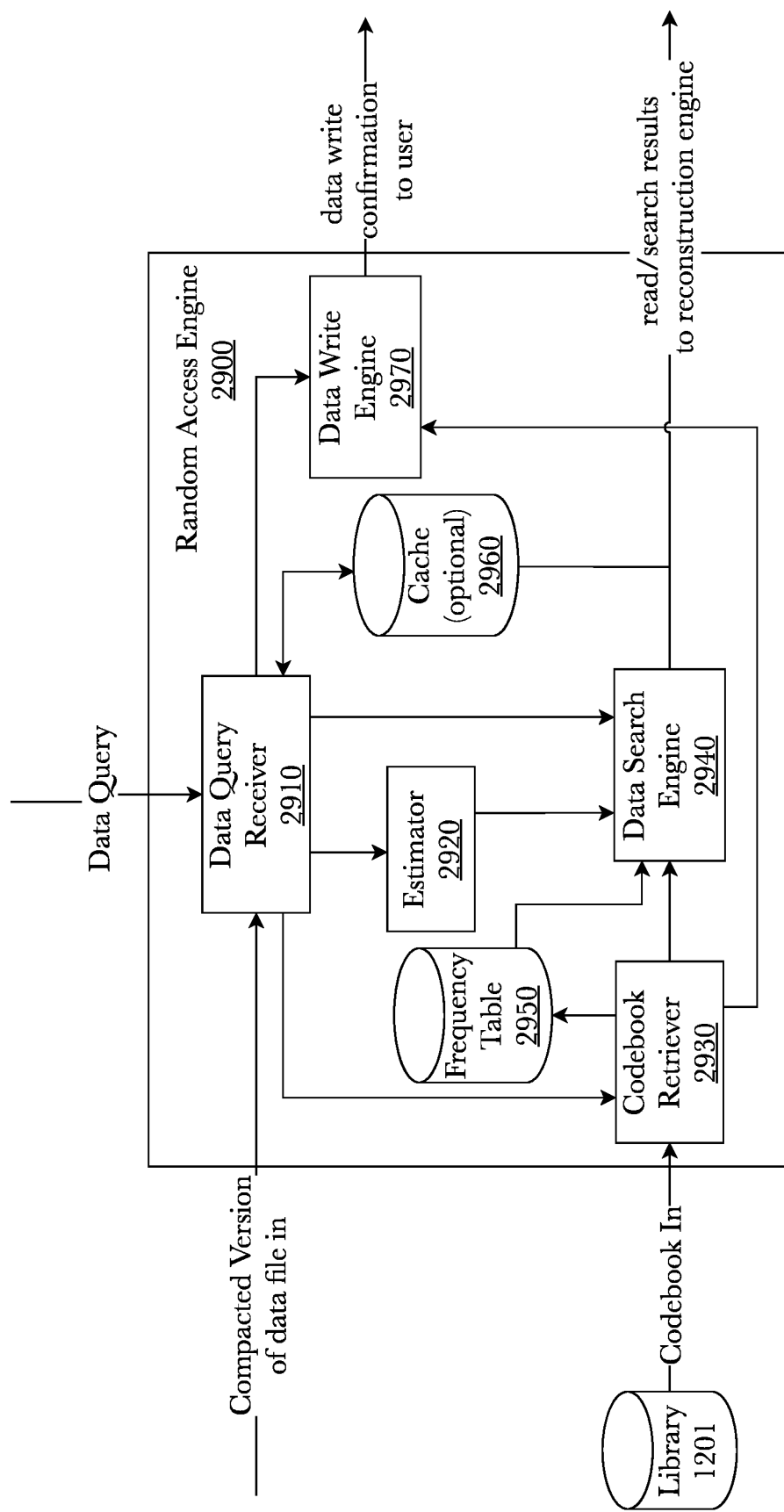
FIG. 29 is a diagram showing an embodiment of one aspect of the system, the random access engine.
Figure 34:
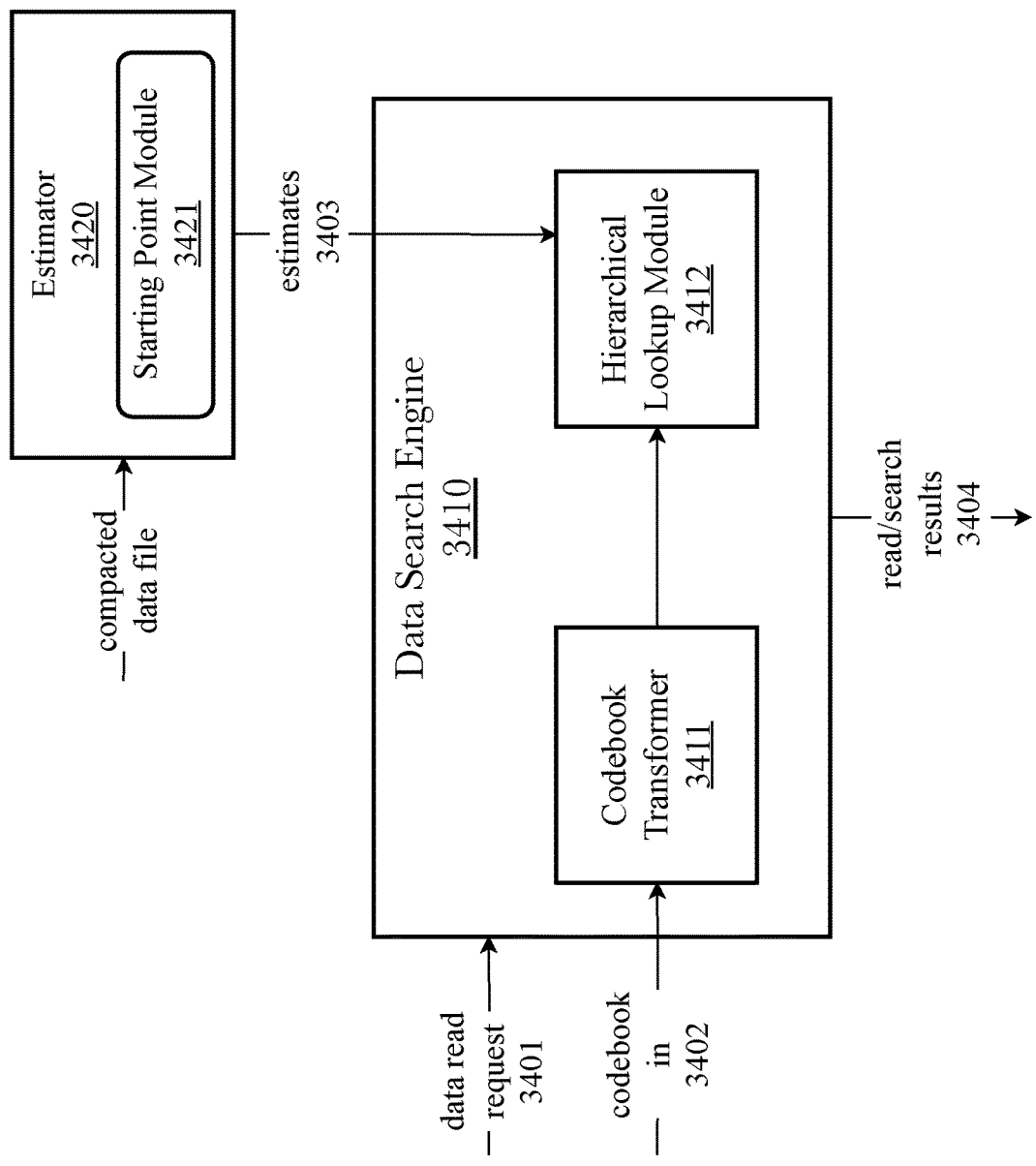
FIG. 34 is a block diagram illustrating an exemplary aspect of a system for data compaction which supports random access capabilities of compacted data, a data search engine and an estimator.

FIG. 34 is a block diagram illustrating an exemplary aspects of a system for data compaction which supports random access capabilities of compacted data, a data search engine 3410 and an estimator 3420. According to the embodiment, data search engine 3410 and estimator 3420 may be components of random access engine 2800 as illustrated in FIG. 29. In other embodiments, data search engine 3410 and estimator 3420 may be arranged in a distributed manner wherein they and the other components of random access engine 2800 need not be operating on the same system (e.g., computing device, server, mobile device, etc.). According to the embodiment, data search engine 3410 may be configured to optimize random access searches of compacted data by transforming a codebook into a hierarchical index to improve data search time and reduce the chance at returning the incorrect data.

According to the embodiment, data search engine 3410 can be configured to receive a data read request 3401. Responsive to the data read request, data search engine 3410 may receive, retrieve, or otherwise obtain the codebook 3402 from a suitable data storage system, library manager, data deconstruction engine, or some other component of system. The obtained codebook may be processed by a codebook transformer 3411 configured to transform the structure of the codebook to a hierarchical index representation. Hierarchical indexing can be used to efficiently organize and access compacted sourceblocks, each associated with a unique codeword. This approach can help manage and retrieve data blocks while taking advantage of the hierarchical structure of the codewords. According to an embodiment, codebook transformer 3411 may determine the hierarchical structure based on your specific requirements. For example, the hierarchy may be organized based on Huffman codewords. The transformed codebook may be sent to or otherwise obtained by a hierarchical lookup module 3412 configured to scan the transformed codebook to retrieve the data associated with the data read request 3401.

According to various embodiments, deconstruction engine and library manager may assign the shortest codewords to the most frequently occurring sourceblocks. This property can be leveraged to create a hierarchical structure. In an exemplary process, system may start with a root node of the hierarchy, which represents an empty codeword. For each codeword, follow the path from the root to the corresponding leaf node, creating intermediate nodes as needed. Each leaf node represents a unique codeword. At each leaf node, associate the data block with the codeword as a key-value pair in the codebook. This hierarchical indexing approach leverages the hierarchical nature of the assigned codewords, making it efficient for managing and accessing data blocks associated with unique codewords. It optimizes both storage and retrieval operations, taking advantage of the properties of encoding in the process.

According to an embodiment, when a new data block is to be added with its associated codeword, the system can follow the path in the hierarchy to the appropriate leaf node and insert the new key-value pair into the codebook.

According to an embodiment, to search for data blocks using partial codewords, system can traverse the hierarchy as far as the available codeword allows, which can be useful for prefix-based searches.

A hierarchical index, as described above, lends itself to efficient random access of data blocks, particularly when dealing with numerous data blocks bearing unique codewords. Hierarchical lookup module 3412 can facilitate the access process on a hierarchically indexed codebook. This access process initiates at the root node of the hierarchy, from which a hierarchical path traversal commences. The hierarchical traversal proceeds by interpreting each bit within the codeword, where '0' and '1' signify movement to the left and right, respectively. This traversal continues until the leaf node corresponding to the complete codeword is reached. The data block associated with this leaf node can then be accessed. The hierarchical structure's efficiency in random access results from reducing the search space as one traverses the hierarchy, restricting navigation to depths in correspondence with the bits in the codeword. The access process is advantageous, especially when dealing with diverse codeword lengths. User provided locational hints may be used by hierarchical lookup module 3412 to determine which leaf or node to commence the search from. Hierarchical lookup module 3412 may receive a data search request which may be associated with a start codeword. In an implementation, logically a start codeword is the initial point at which data may be retrieved to satisfy the query request. Random access engine may use lookup module 3412 to traverse the hierarchical representation of the codebook until a start codeword is located. The start codeword and any subsequent codewords relevant to the query request may be retrieved and returned to a decoder (e.g., data reconstruction engine) for decoding.

Also present in the embodiment is estimator 3420 which can provide initial estimates for a starting location to begin searching for the data associated with data read request 3401 as well as refine user provided hints or estimates. According to an implementation, estimator 3420 may estimate the one or more possible starting points using a distinct value estimate mechanism via a starting point module 3421. Distinct value estimation, also known as cardinality estimation or unique value estimation, is a process used to determine the number of distinct or unique values in a dataset.

Some techniques that may be used by starting point module 3421 to perform distinct value estimation can include, but are not limited to, counting approaches (e.g., exact counting, HyperLogLog, etc.), sampling methods (reservoir sampling, min hashing, etc.), probabilistic data structures (e.g., bloom filters, count-min sketch, etc.), and statistical estimation, to name a few. These estimates 3403 may be sent to data search engine 3410 and used by hierarchical lookup module 3412 as an initial node/leaf at which to begin the search.

The distinct values may be associated with a codeword and/or a codeword boundary. In some implementations, estimator 3420 perform a distinct value estimate to determine one or more codeword boundaries, wherein the one or more codeword boundaries may be used as starting points for facilitating a random access read of compacted data. In some implementations, an initial estimate or user provided hint may be refined be performing a distinct value estimate.

Figure 35:
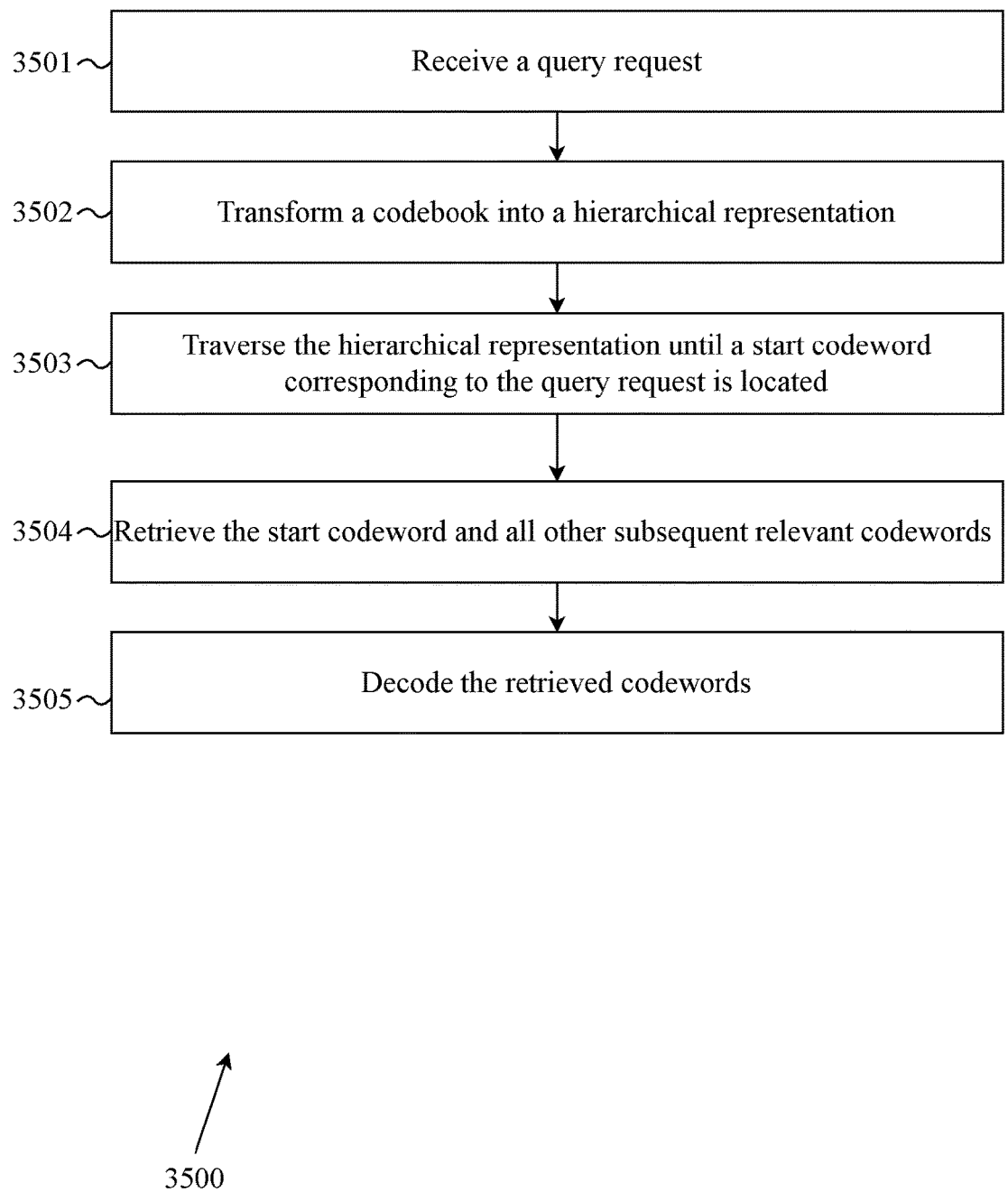
FIG. 35 is a flow diagram illustrating an exemplary method for performing random access search on a compacted data file using a transformed codebook, according to an embodiment.

FIG. 35 is a flow diagram illustrating an exemplary method 3500 for performing random access search on a compacted data file using a transformed codebook, according to an embodiment. According to the embodiment, the process begins at step 3501 when random access engine receives a query request from a query process. The query process may be associated with a user, for example a user may submit a data read request to database which stores a plurality of compacted data files. In other instances, the query process may be associated with an automated system or process, for example an application subsystem performing a data write operation to a compacted data file. At step 3502, random access engine, via codebook transformer 3411, can transform the codebook used to compact the data file into a hierarchical representation according to methods described herein. In some implementations, these methods can include one or more or less of the following steps: determining hierarchy levels; selecting a root node; grouping and nesting data; defining relationships; selecting a data structure (e.g., dictionaries, trees, or graphs); traversing and building; visualizing; testing and validating; and performing maintenance and updates.

At a next step 3503, hierarchical lookup module 3412 can traverse the hierarchical representation until a start codeword corresponding to the query request is located. At step 3504, the start codeword is retrieved and all other subsequent, relevant codewords are also retrieved from the compacted data file. The codewords are relevant with respect to the query request. A plurality of subsequent codewords may be retrieved to satisfy the query request. As a last step 3505, the retrieved codewords may be sent to a decoder and decoded. In an embodiment, data reconstruction engine 108 may be implemented as a decoder. The decoded data may then be returned to the appropriate endpoint associated with the request process. For example, if a user submitted a query, then the decoded data may be sent to user interface 2810 where it may be viewed by the user.

Figure 36:
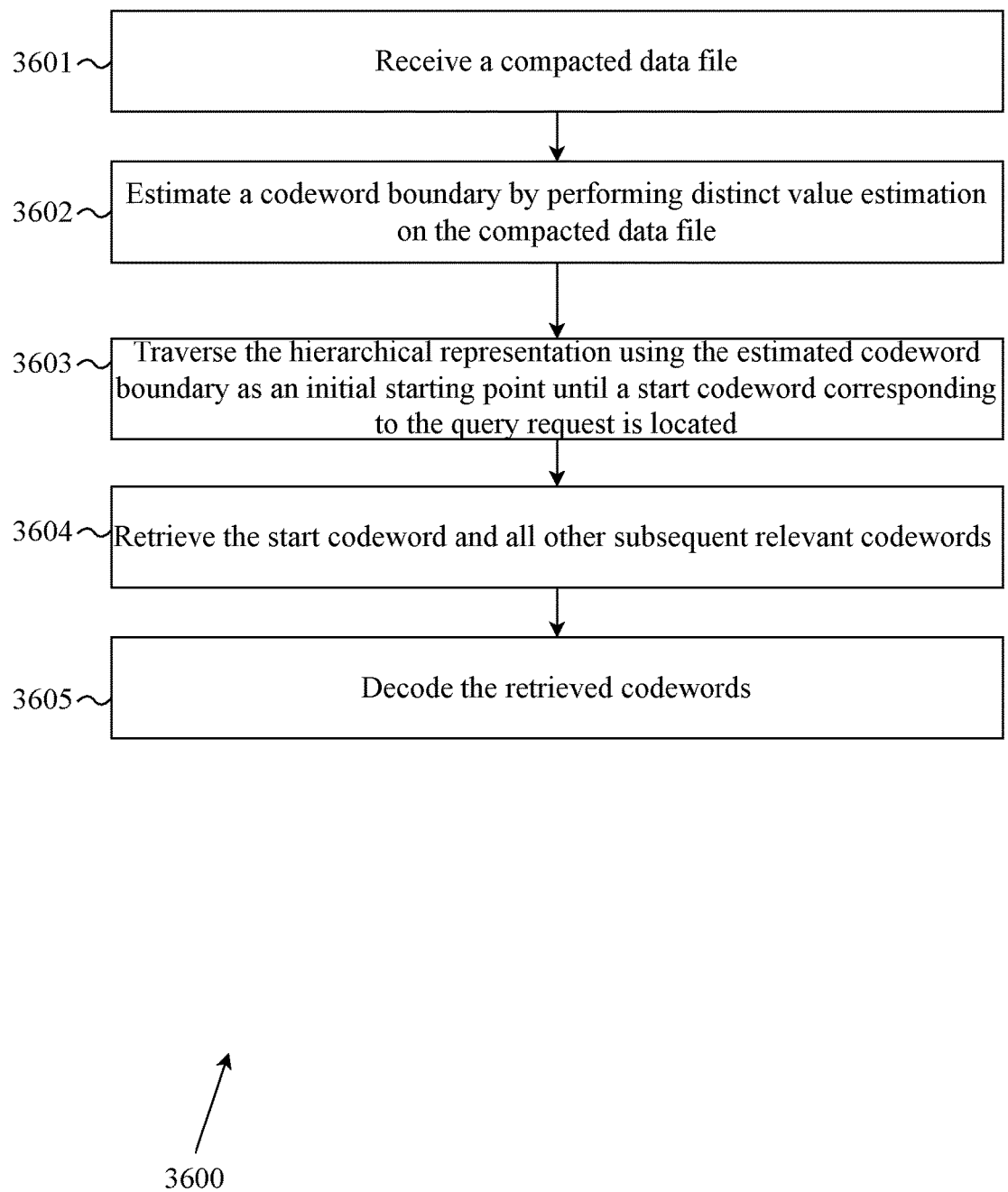
FIG. 36 is a flow diagram illustrating an exemplary method for performing random access search on a compacted data file using a transformed codebook and an initial estimate, according to an embodiment.

FIG. 36 is a flow diagram illustrating an exemplary method 3600 for performing random access search on a compacted data file using a transformed codebook and an initial estimate, according to an embodiment. According to the embodiment, this process may be triggered when a query request is received by random access engine. Data search engine 3410 may transform a codebook into a hierarchical representation which can be used for query response optimization. According to the embodiment, the process begins at step 3601 when estimator 3420 receives a compacted data file. The compacted data file being compacted using a codebook as described herein. At step 3602, estimator module estimates a codeword boundary by performing distinct value estimation on the compacted data file. The distinct values determined by this step may be associated with the various codeword boundaries contained within the compacted data file. At step 3603, random access engine can traverse the hierarchical representation using the estimated codeword boundary as an initial starting point until a start codeword corresponding to the query request is located. At step 3604, the start codeword is retrieved and all other subsequent, relevant codewords are also retrieved from the compacted data file. The codewords are relevant with respect to the query request. A plurality of subsequent codewords may be retrieved to satisfy the query request. As a last step 3605, the retrieved codewords may be sent to a decoder and decoded. In an embodiment, data reconstruction engine 108 may be implemented as a decoder. The decoded data may then be returned to the appropriate endpoint associated with the request process. For example, if an application requested a data read operation, then the decoded data would be sent back to the requesting application.

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
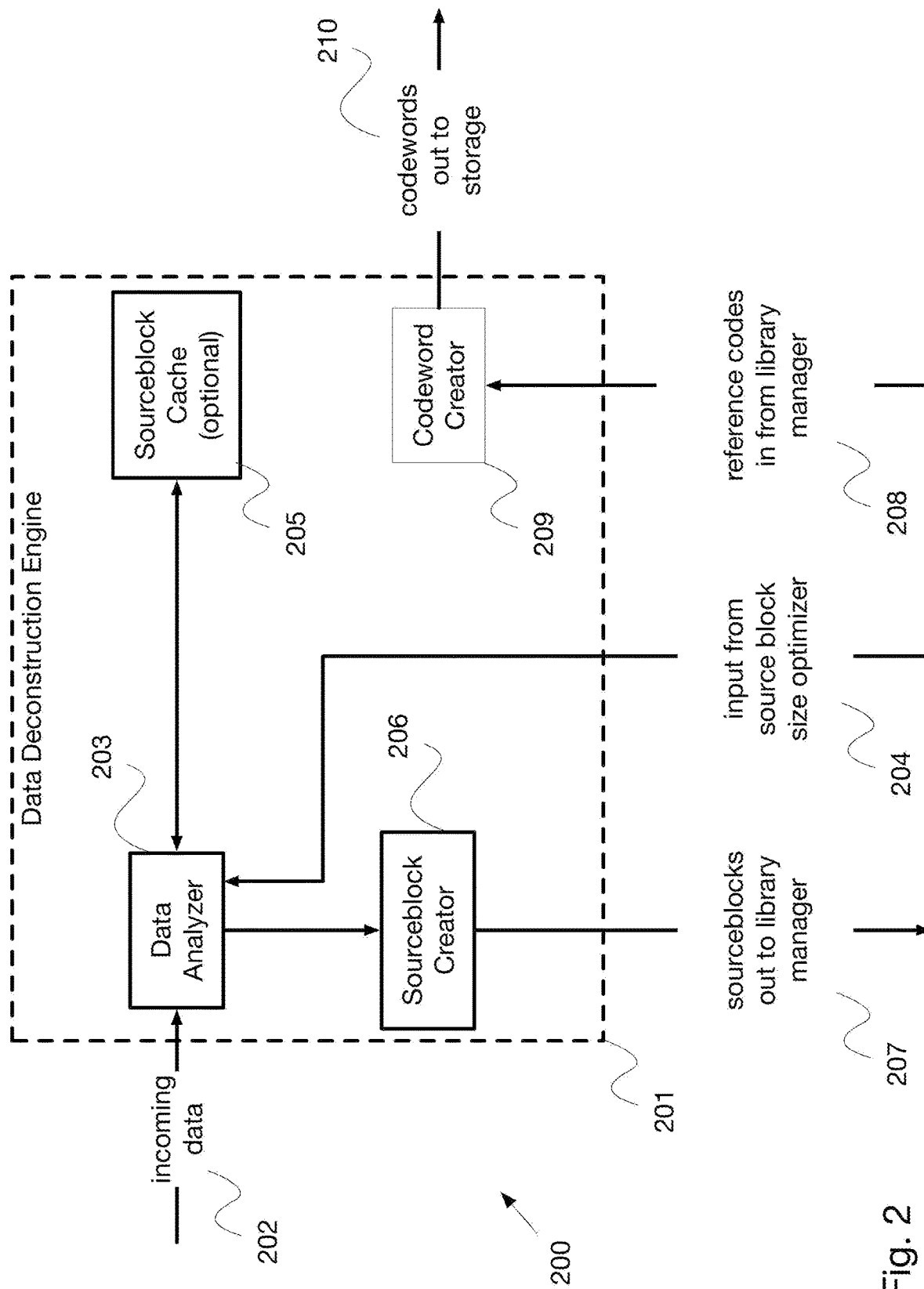
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock each e 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
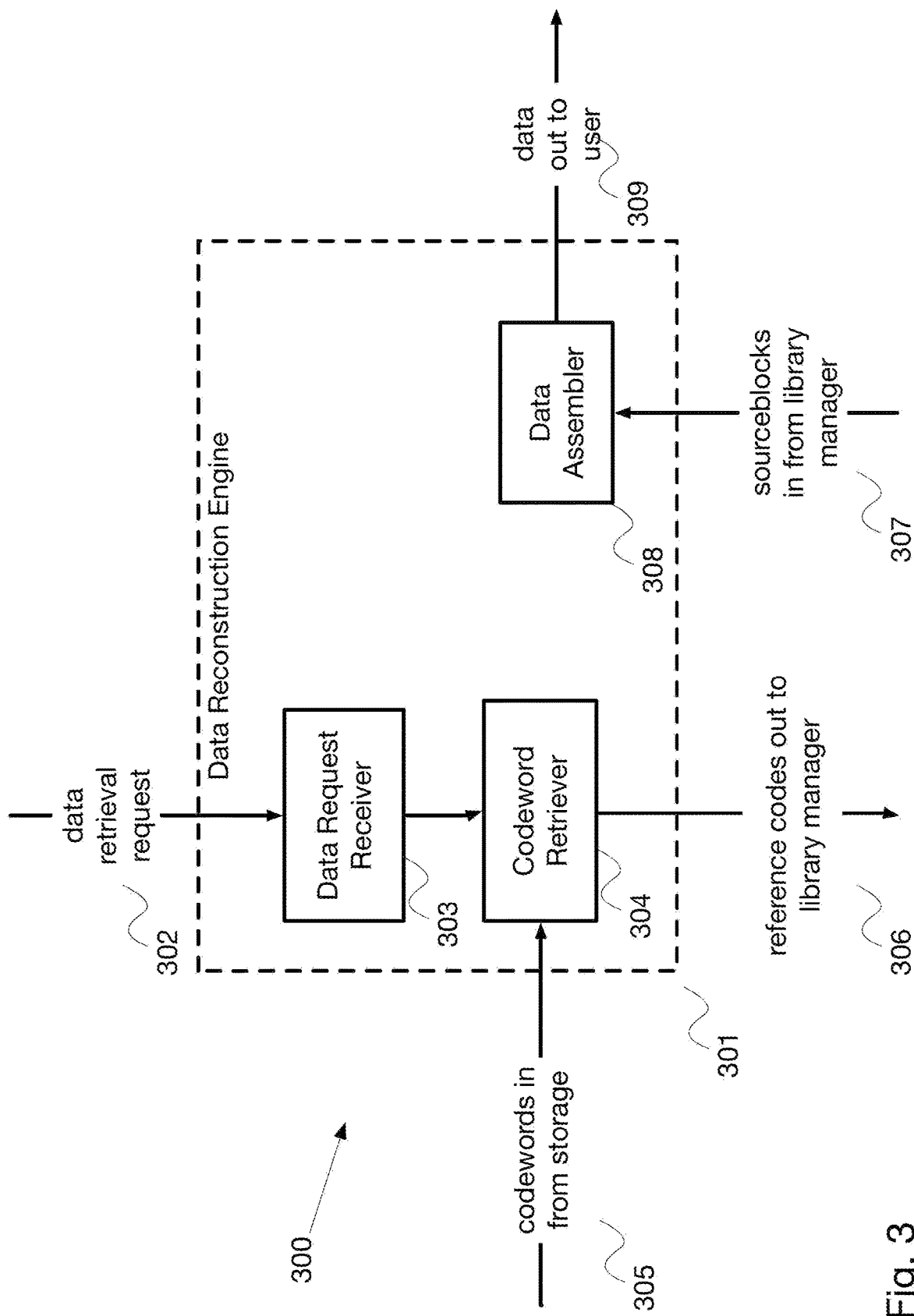
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
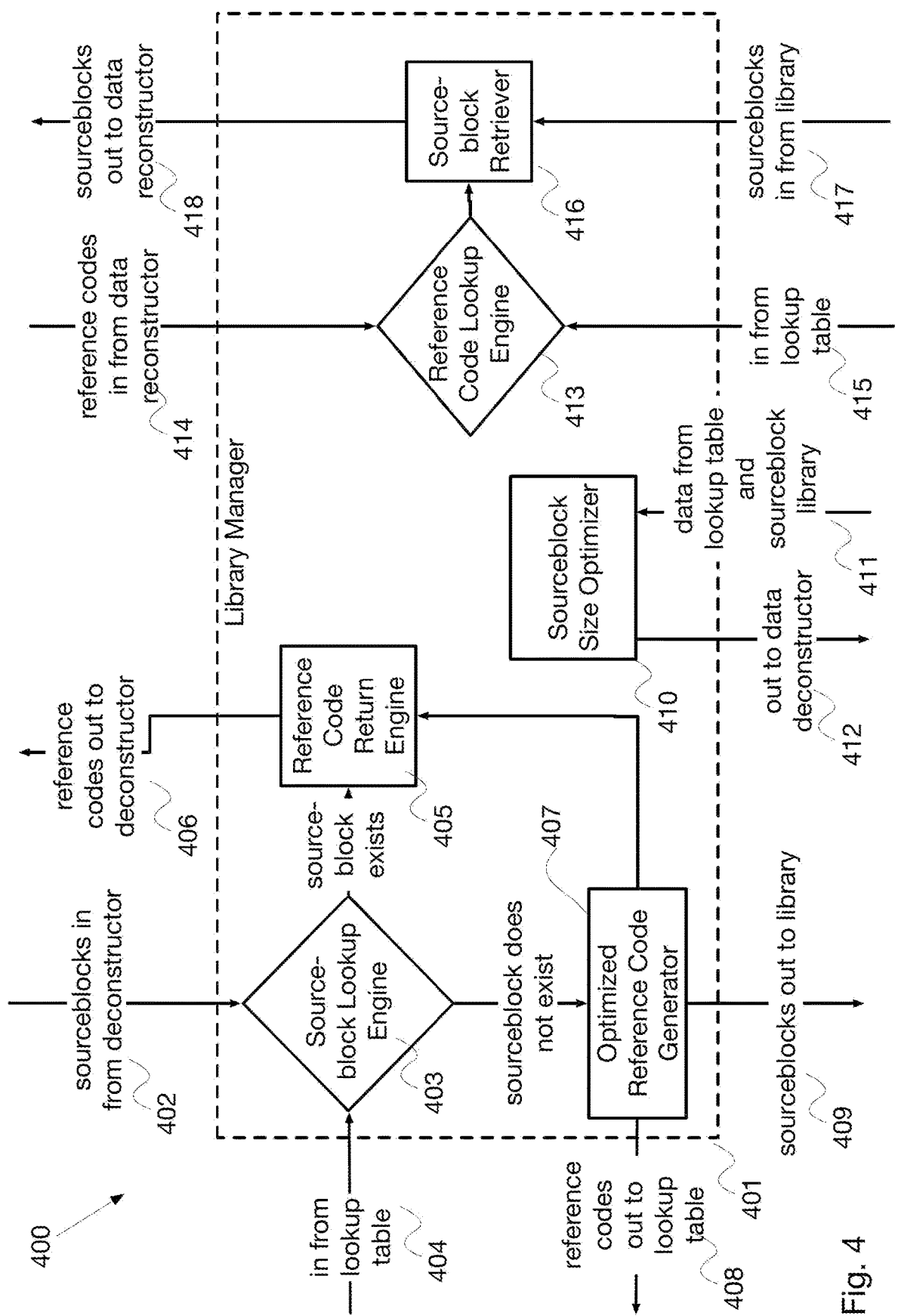
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
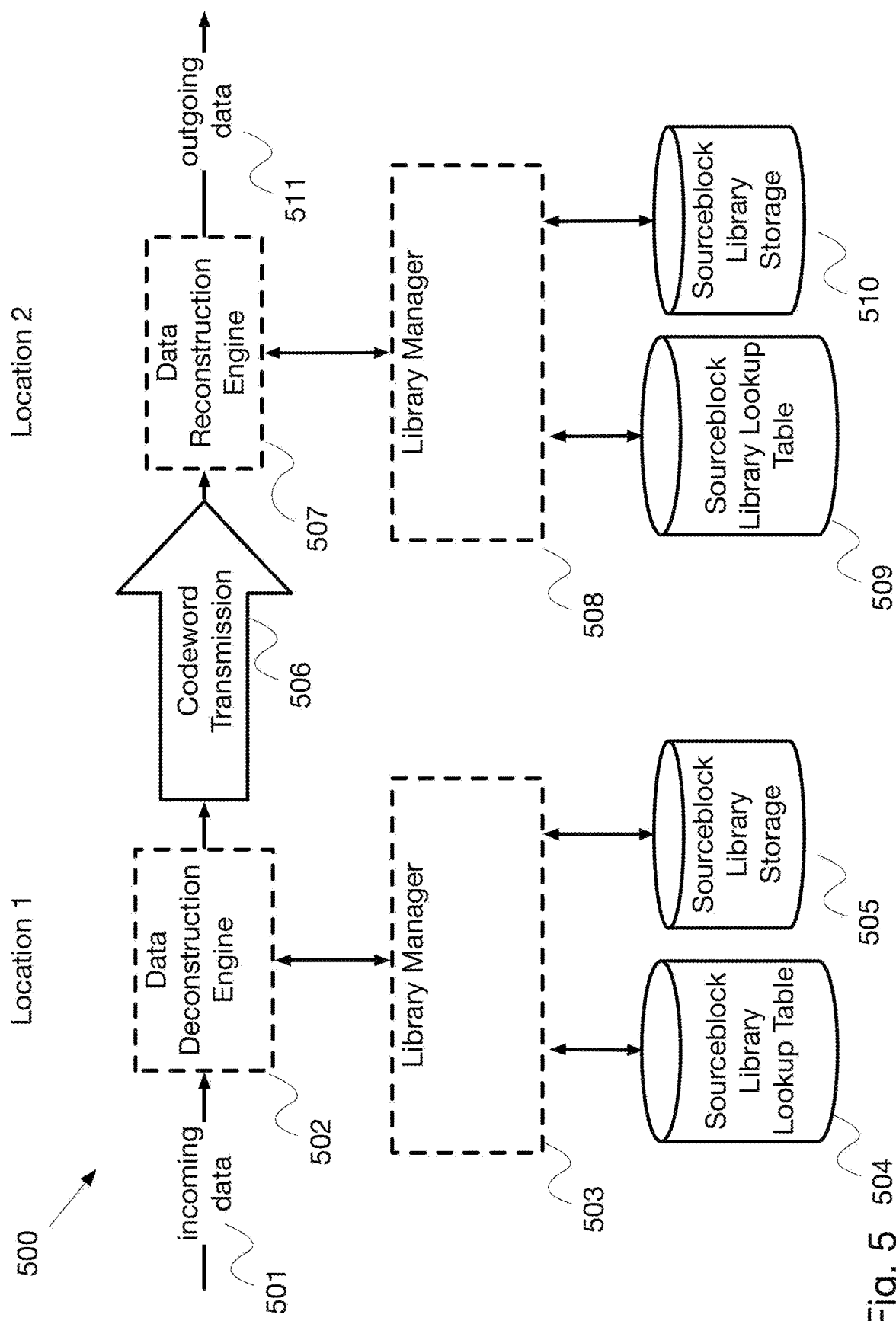
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
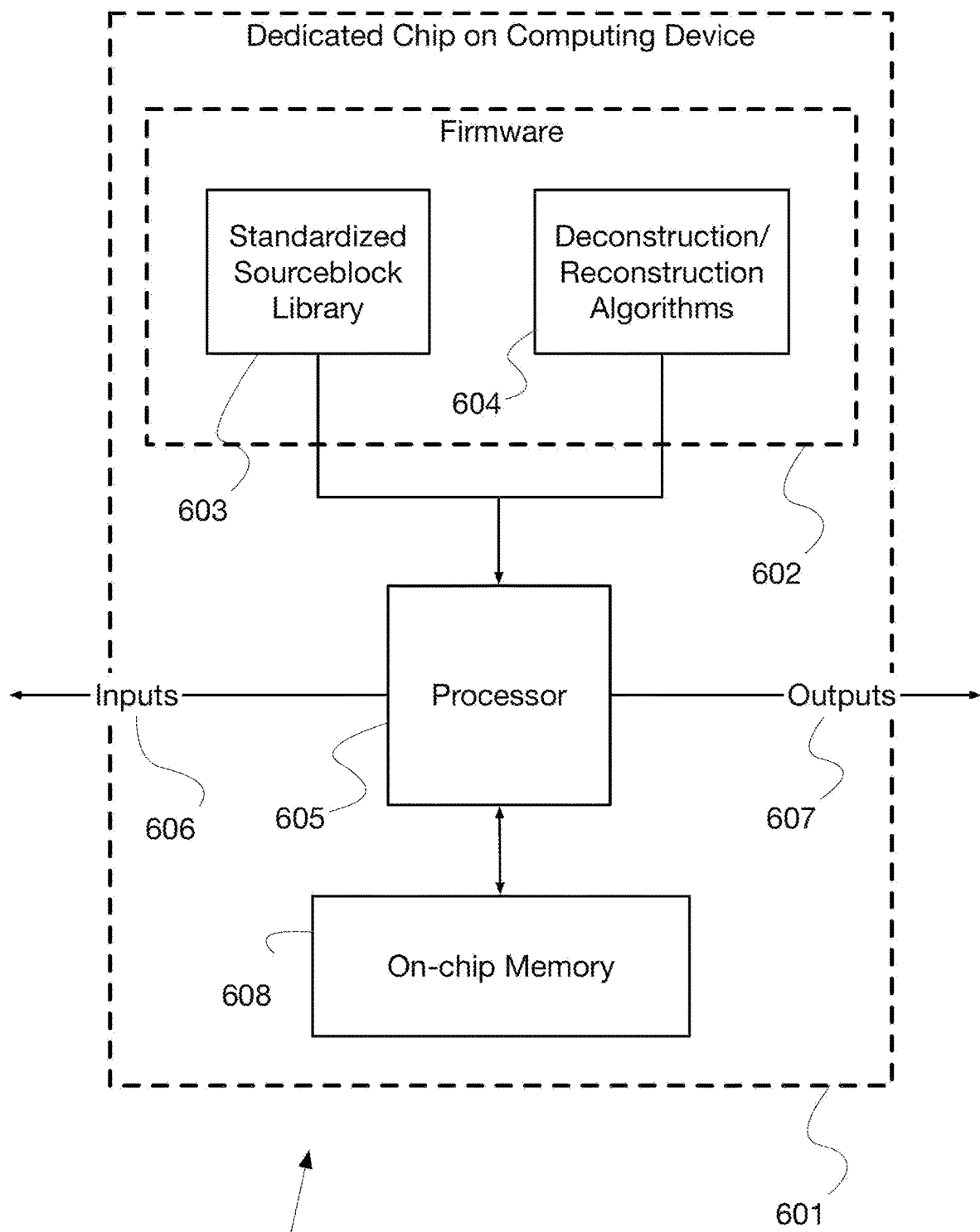
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
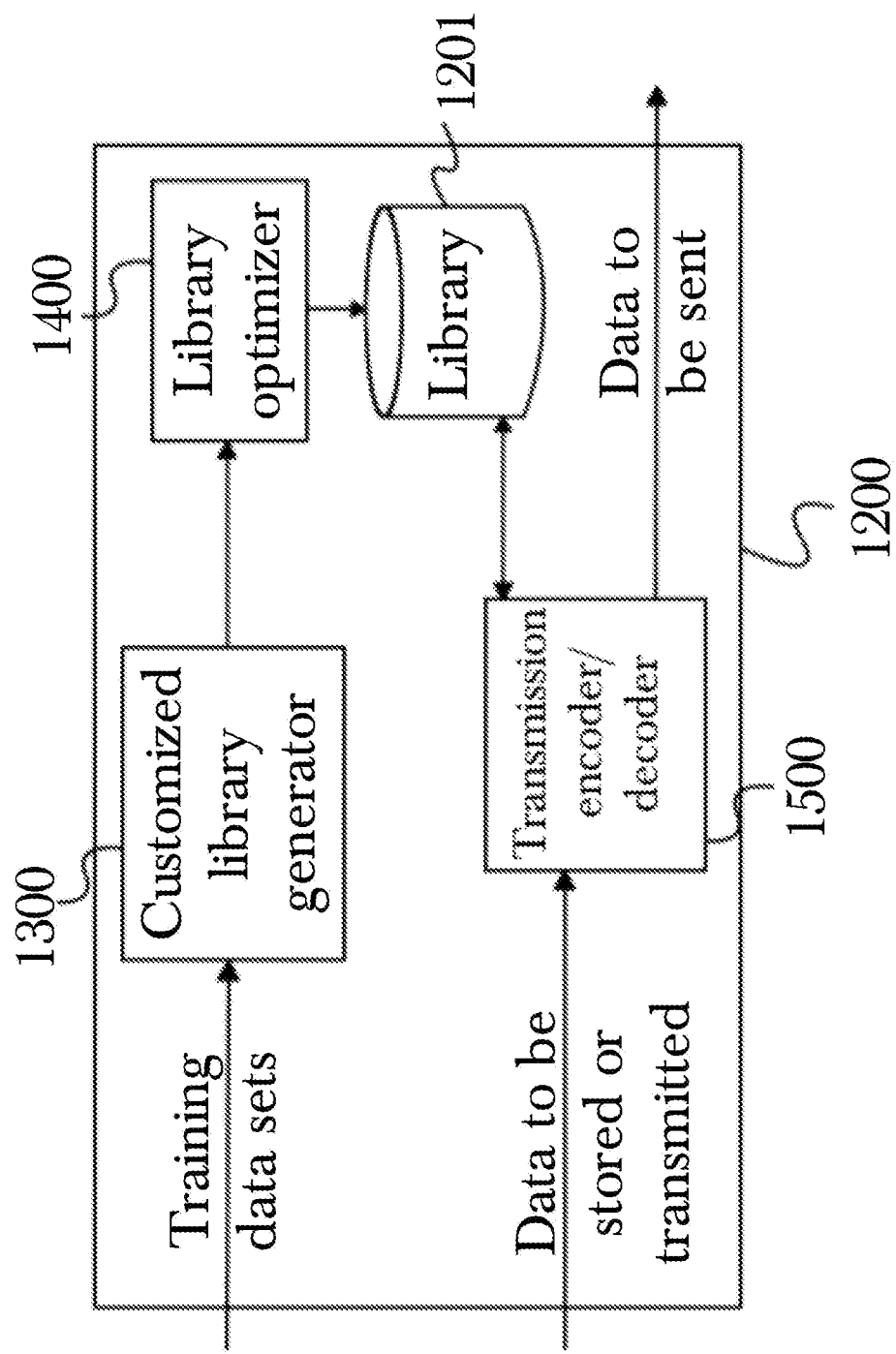
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS}$$

so that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1.$$

This is a reasonable scenario given that typical values in real-world practice are C=0.32, $R_C$=1.1·10$^{12}$, $R_D$=4.2·10$^{12}$, S=10$^{11}$, giving $$\frac{CS}{R_C} + \frac{S}{R_D} = 0.053.$$

. . . , such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in delay$_{invention}$≈3.3·10$^{-10}$ while delay$_{priorart}$≈1.3·10$^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
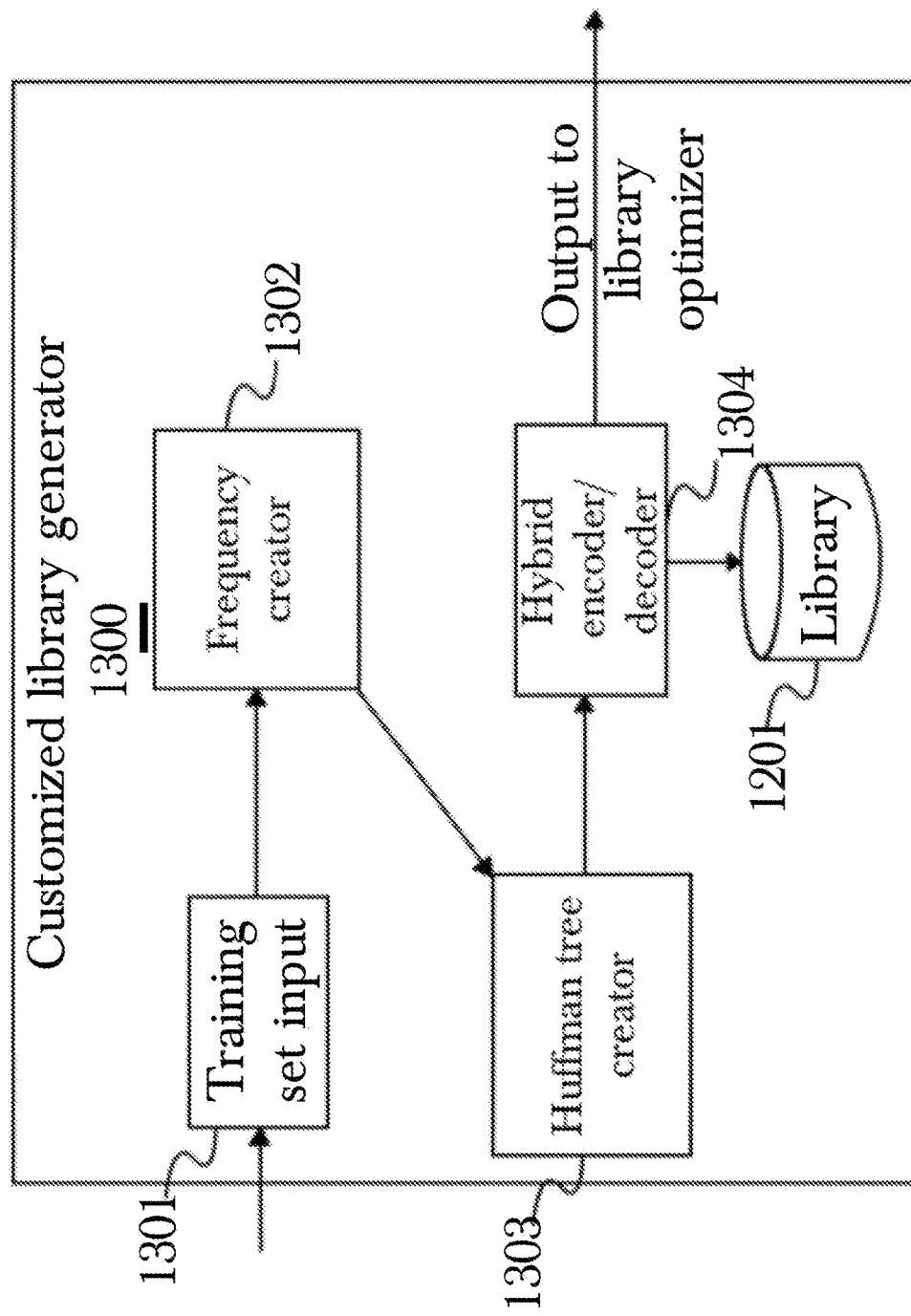
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
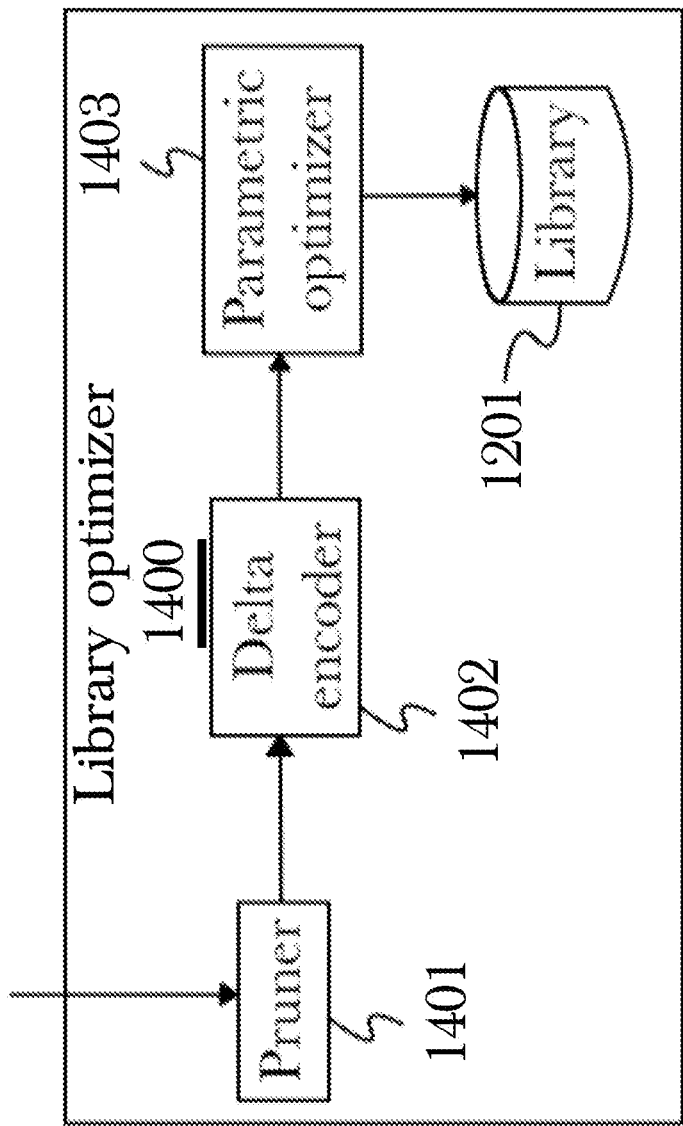
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
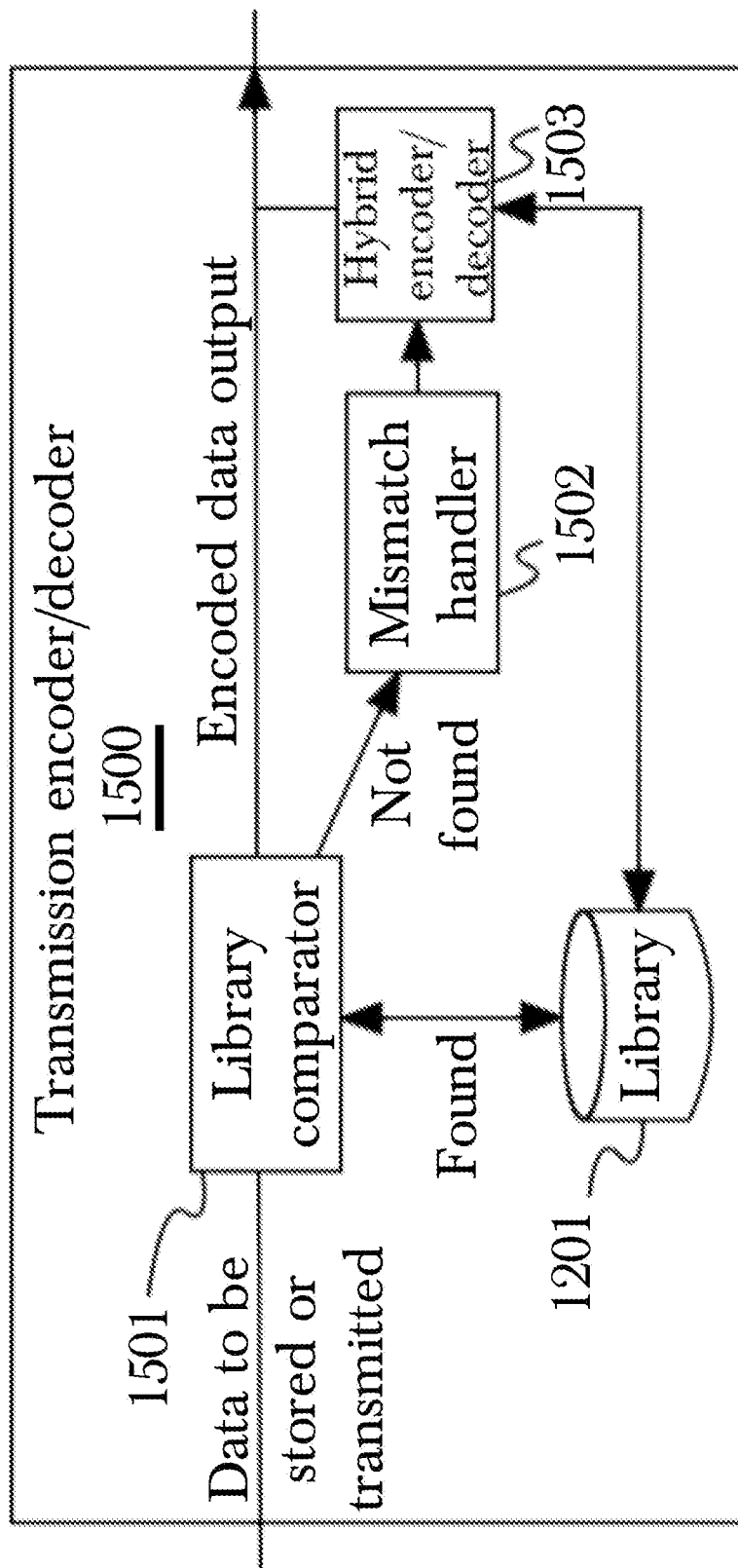
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length t and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
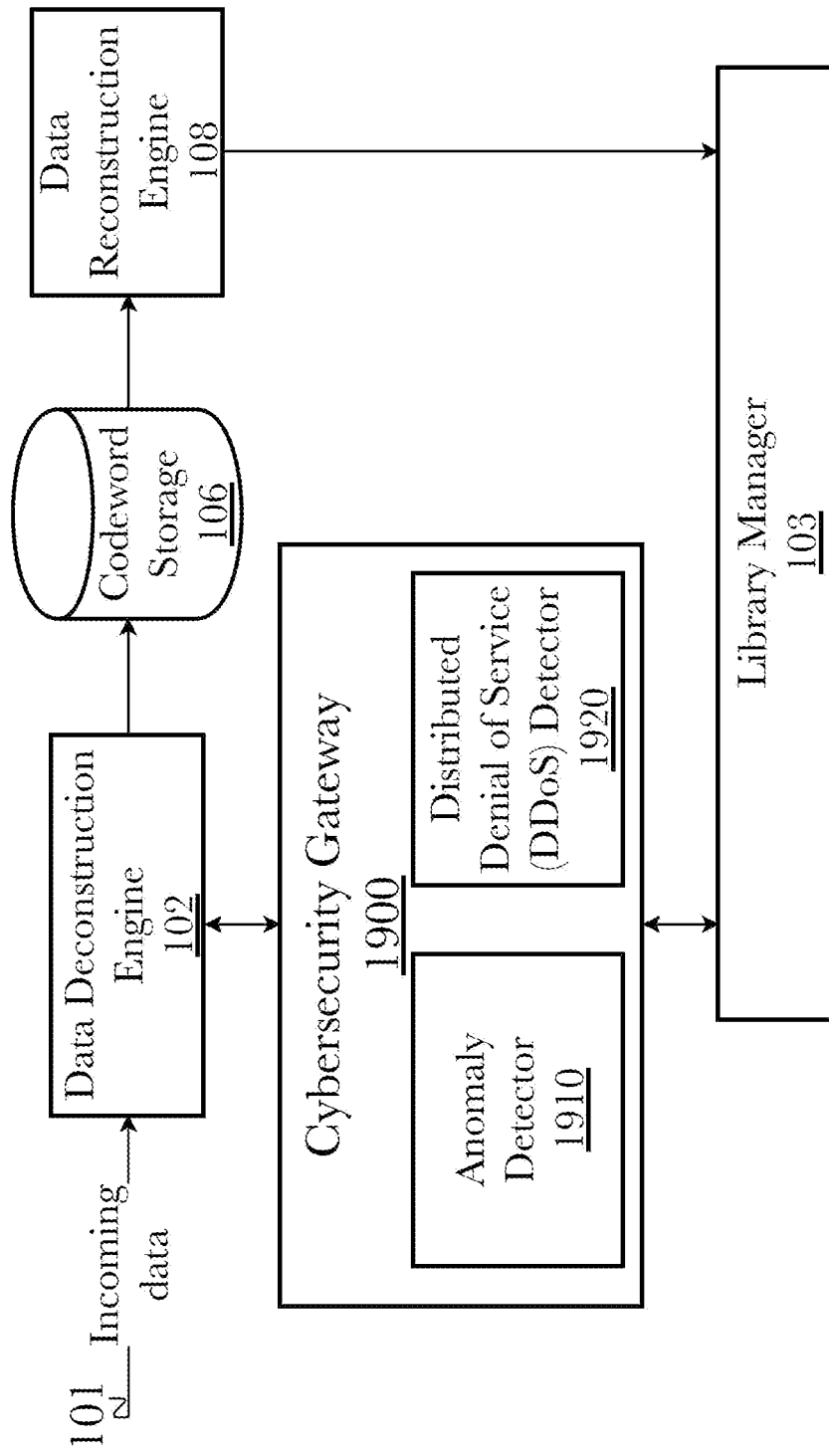
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDOS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDOS detector 1920 examines incoming data to determine whether there is a disproportionate amount of repetitive data. A disproportionate amount of repetitive data may indicate that a DDOS attack is in progress. If the disproportionate amount of repetitive data exceeds an established threshold or persists for a certain length of time, the DDOS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDOS attack.

Figure 22:
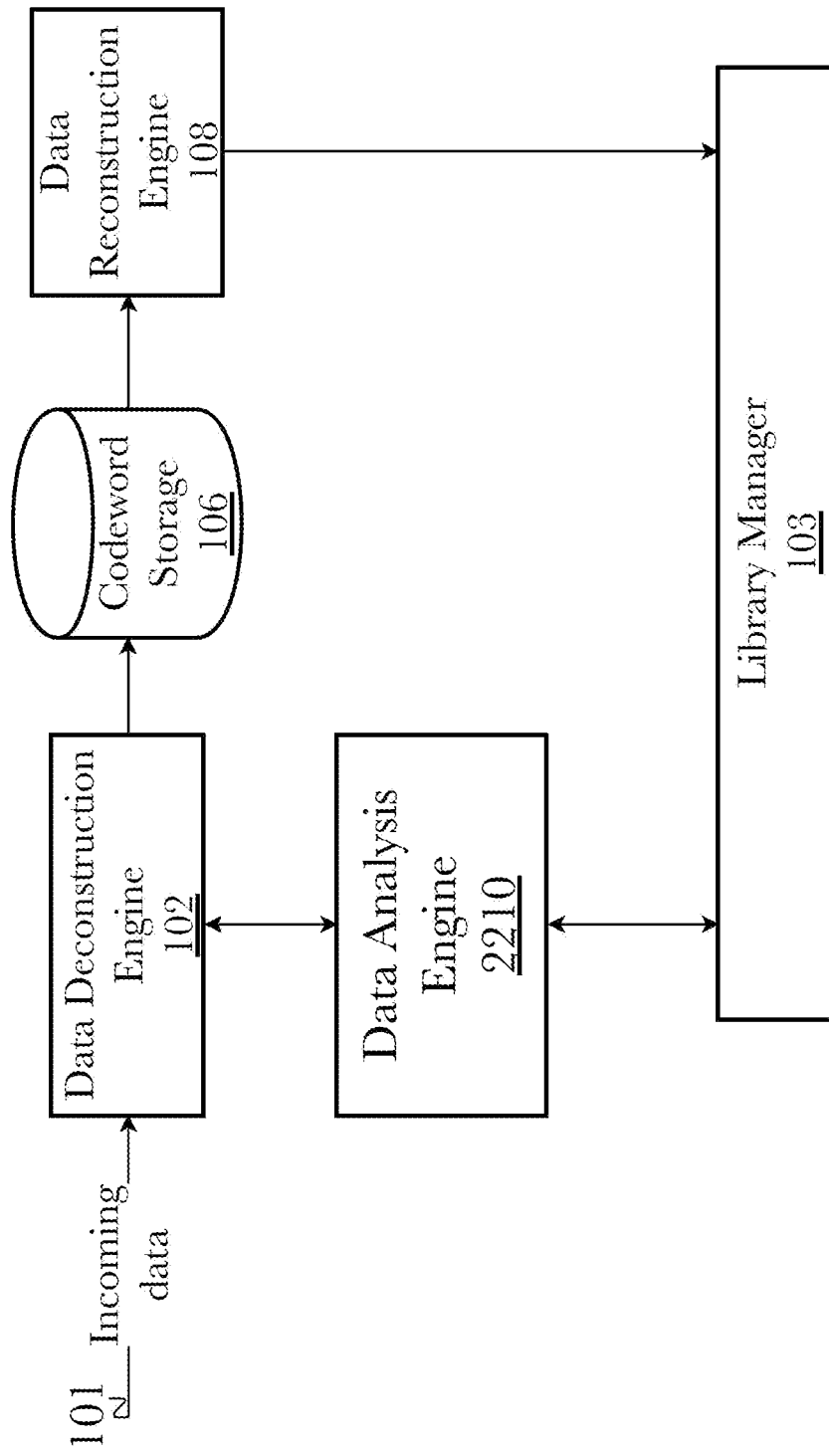
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
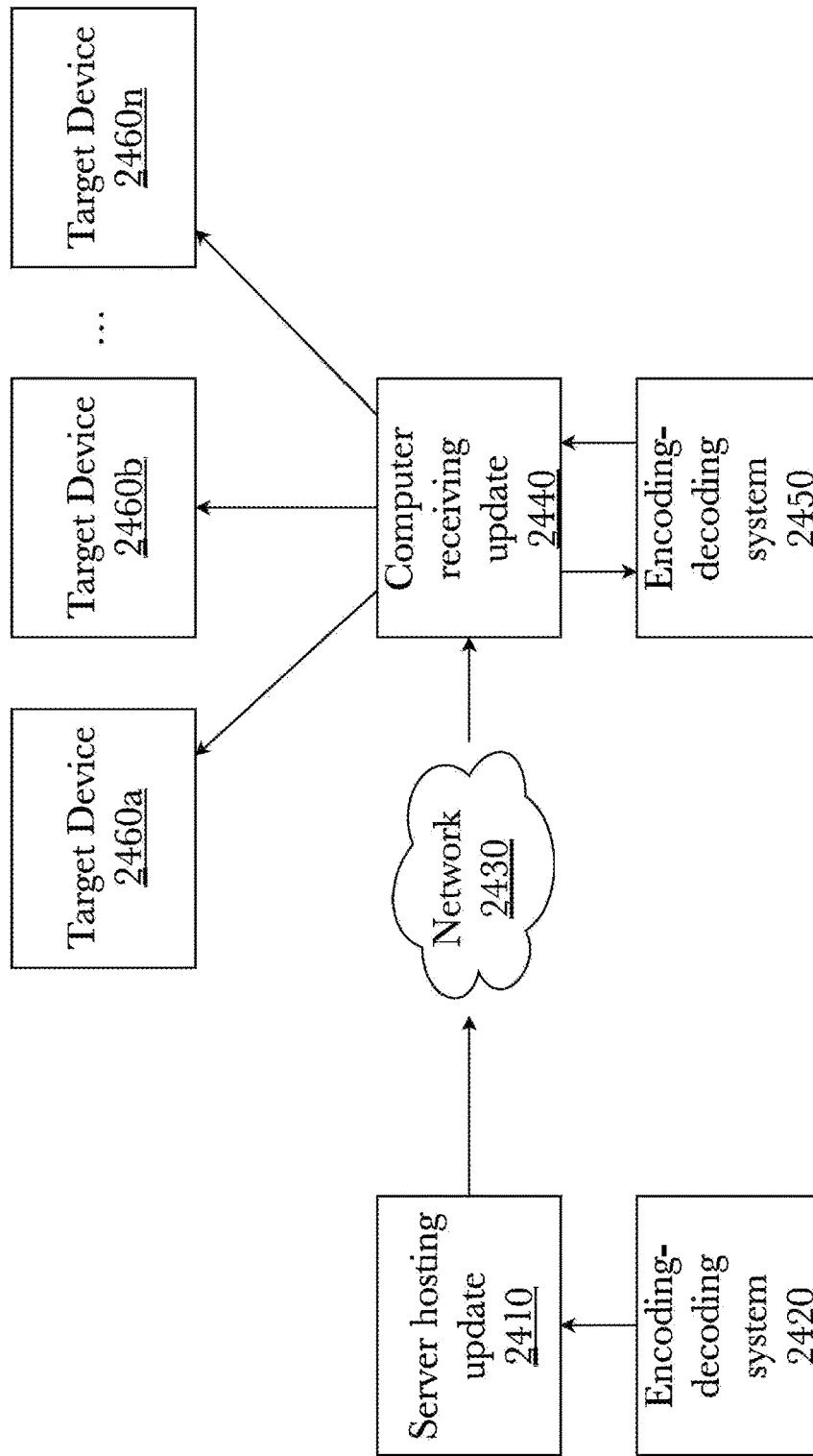
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460*a-n*, using a local network or other high-bandwidth connection.

Figure 26:
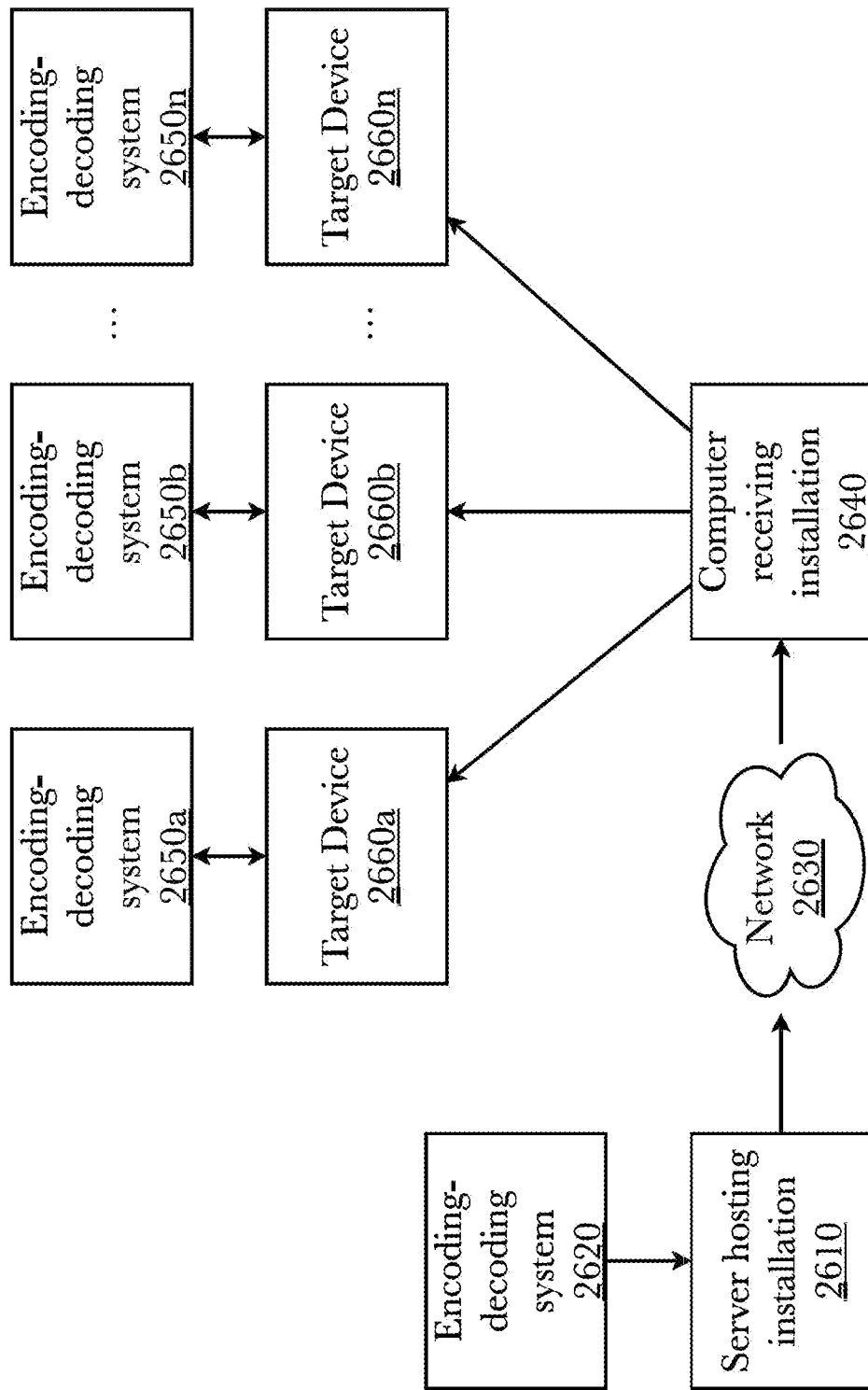
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650*a-n* is stored on or connected to one or more target devices 2660*a-n*, along with a codebook or library of reference codes that the hosting server 2610 shares. The software is retrieved from storage at the hosting server 2610 in the form of codewords, and transferred over the network 2630 in the form of codewords to the receiving computer 2640. However, instead of being reconstructed at the receiving computer 2640, the codewords are transmitted to one or more target computing devices, and reconstructed and installed directly on the target devices 2660*a-n*. In this way, a far smaller file size, and smaller total update size, may be sent over a network or transferred between computing devices, even where the network 2630 between the receiving computer 2640 and target devices 2660*a-n* is low bandwidth, or where there are many target devices 2660*a-n*.

Figure 28:
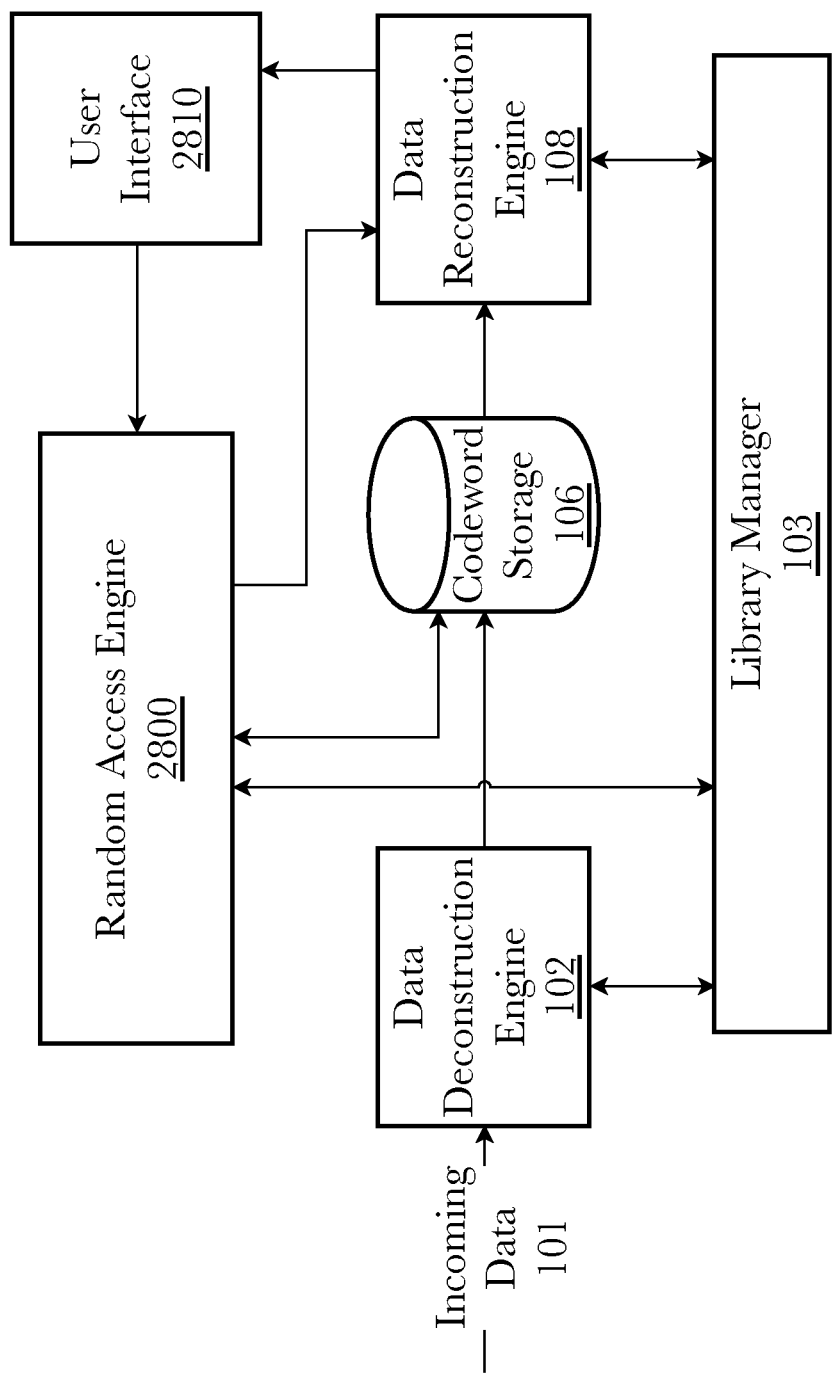
FIG. 28 is an exemplary system architecture of a data encoding system with random access capabilities.

FIG. 28 is an exemplary system architecture of a data encoding system with random access capabilities. Much like in FIG. 1, incoming data 101 to be deconstructed is sent to a data deconstruction engine 102, which may attempt to deconstruct the data and turn it into a collection of codeword using a library manager 103. Codeword storage 106 serves to store unique codeword from this process, and may be queried by a data reconstruction engine 108 which may reconstruct the original data from the codeword, using a library manager 103. However, a random-access engine 2800 exists that receives a data query request from a user interface 2810 such as a graphical user interface. The query request may comprise identification of a compacted data file to search and a search term, and optionally a location hint. Various possible search term configurations may exist such as a byte range (i.e., begin at byte N and return M number of bytes), a string such as "volleyball" or a date such as "11/06/2020", among others. The random access engine 2800 may also query the library manager 103 for retrieval of the reference codebook corresponding to the identified compacted data file. Additionally, the random access engine 2800 may query the codeword storage 106 for retrieval of a plurality of codeword, the plurality of codeword representing the compacted data file to be searched and read from. When the search term has been found, it may be sent to the data reconstruction engine 108 where it may be decoded to recover the original data, and the original data may be sent to the user interface 2810. The user may verify the search result is correct. If the result is incorrect the user may refine and submit a new search request.

FIG. 29 is a diagram showing an embodiment of one aspect of the system, the random access engine 2900. The process begins when a data query request is made to the application. A data read query may comprise identification of a compacted data file to access, a search term, and optionally a location hint serving as an initial guess as to the location of the search term within the original data file. As a simple example of a data read query, the user searches for the string "cosmology" in a compacted data file "Y" to read from, and a location hint of byte "N" to be used to estimate where in "Y" the string "cosmology" may occur. Additionally, the random access engine 2900 may receive a data write query which may include the write term to be written and an identified compacted data file in which to write the write term. A data query receiver 2910 parses both data read and data write queries and retrieves the identified compacted data file in the form of a plurality of codeword from codeword storage 106. The data query receiver 2910 then sends the retrieved compacted data file and the search term to the data search engine 2940. If the data search query includes a location hint, then the query receiver 2910 may send the location hint to an estimator 2920. A location hint may be given that represents where in the original file the data to be read may be located, and the estimator receives the location hint and estimates that same location in the compacted version of the data file. A location hint may comprise a byte location N in the original file X, the estimator 2920 estimates the location (bit number) N' in Y (compacted version of data file) corresponding to byte N in X. The estimator 2920 may check if the estimated location N' is located at a codeword boundary or in the middle of a codeword. If N' lies within a codeword, then the estimator may use bit-scrolling backward and forward to find the codeword boundary. Additionally, the location hint may comprise a user command such as "start at the 45% mark". The estimator 2920 sends the estimated location of the byte range to the data search engine 2940 for further processing.

A codebook retriever 2930 receives a signal form the data query receiver 2910 that prompts the codebook retriever 2930 to request the codebook and frequency table associated with the compacted data file from a word library 1201. The frequency table 2950 shows the most frequently occurring words or substrings within a data set, and may be used by the data search engine 2940 to refine the location estimate.

The data search engine 2940 receives a data read request in the form of a search term such as a byte range, string, or substring, and may receive an initial location estimate from the estimator 2920 if a location hint was included in the data read query. The data search engine 2940 may use a frequency table 2950 to refine location estimates and identify codeword boundaries in an automatic way. The estimated location may be in the middle of a codeword. If this is the case then the search results will return output that does not match the search query. For example, the search results return a sequence of bytes, the frequency table 2950 may be used to identify whether the sequence of bytes are unlikely to occur in the original data, or if the sequence was reasonably likely then a codeword boundary has probably been found. When a codeword boundary is found, it allows the whole compacted data file to be accessed in any order by jumping from codeword to codeword, facilitating useful search results. If the data request is in a string format and a location hint was provided, then the data search engine 2940 may automatically locate the search string via a binary search from the estimated starting point or a found codeword boundary. The data search engine 2940 may also parse a search term string into sourceblocks and create at least one or more encodings for sub-search strings derived from the original search string. An exemplary parsing process is discussed in more detail in FIG. 33 contained within this disclosure. Additionally, various search operators may be integrated into the search capabilities. A few examples of search operators include "near", "and", "or", and "not". These may be used to narrow the scope of the search. Once the byte range or search string has been located, the codebook may be used to decode the located reference codes belonging to the search string or byte range. In other embodiments, the located reference codes may be sent to the data reconstruction engine 108 which sends the decoded byte range or search string to the user for verification.

A search each e 2960 may optionally be used to store previous search terms and their locations within the compacted data file. The data query receiver 2910 may look for the requested data in the each e 2960 and if it is found in the each e then its location is sent to the data reconstruction engine 108 where the compacted data may be reconstructed and then sent to the user for review.

If the data query is a data write query, then the data query receiver 2910 may send a signal to the codebook retriever 2930 to retrieve the codebook corresponding to the identified compacted version of the data file in which the write term is to be written and send the write term to a data write engine 2970. The codebook retriever 2930 sends the codebook to the data write engine 2970. If the size of the data to be written (write term) is exactly the length of the sourceblock (sourceblock), then the data write engine 2970 can simply encode the data and insert it into the received codebook. More likely, the size of the data to be written does not exactly match the sourceblock length, and simply encoding and adding the codeword to the codebook would modify the output of the codewords globally, basically changing everything from that point on. In an embodiment, when some data is to be inserted into the original data file, the original file may be entirely re-encoded. In another embodiment, instead of re-encoding the entire file, an opcode is created that tells the decoder there is an offset that has to be accounted for when reconstructing the compacted data. In yet another embodiment, instead of using an opcode, there are extra unused bits available in the codebook that can be used to encode information about how many secondary bytes are coming up. A secondary byte(s) represents the newly written data that may be encoded and inserted in the codebook. In this way when encoded bit is found, the data encoder can switch to secondary encoding, encode one fewer byte, then resume normal encoding. This allows for inserting data into the original data file without having to re-encode the entire file.

Description of Method Aspects

Since the library consists of re-usable building sourceblocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require 216, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is 24,096, which for all practical purposes is unlimited. A typical hard drive contains one terabyte (TB) of physical storage capacity, which represents 1,953,125,000, or roughly 231, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are ¹/₁₀ the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are ¹/₁₀ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to re-construct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

Figure 7:
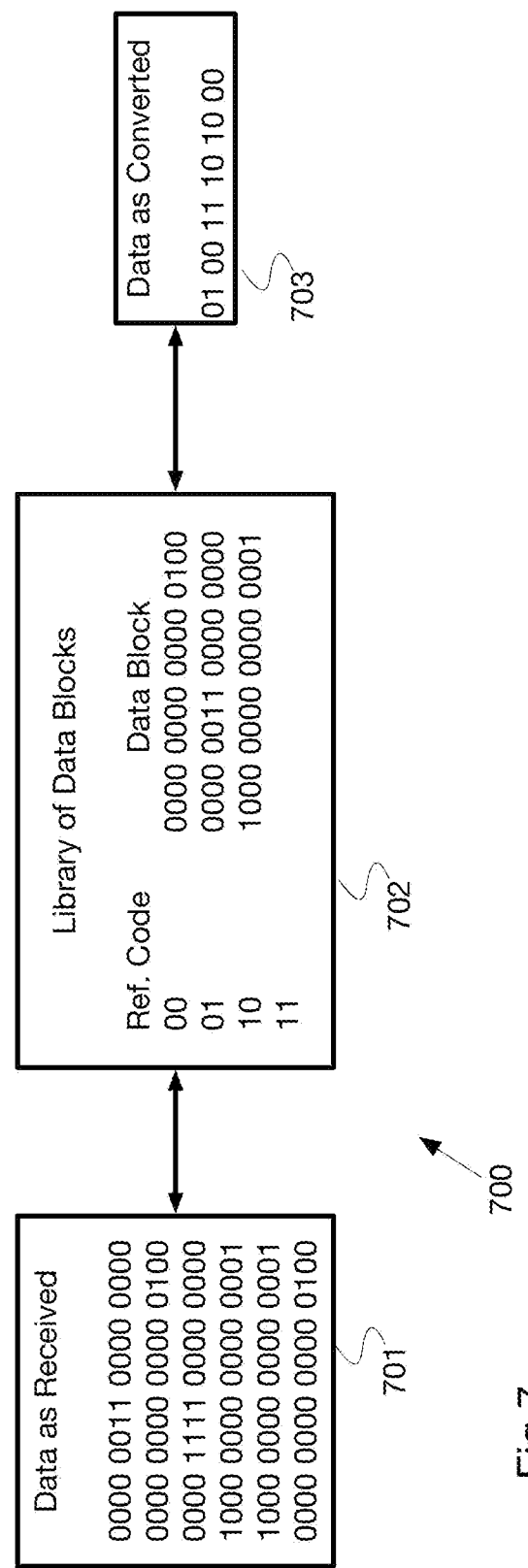
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410. In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

Figure 8:
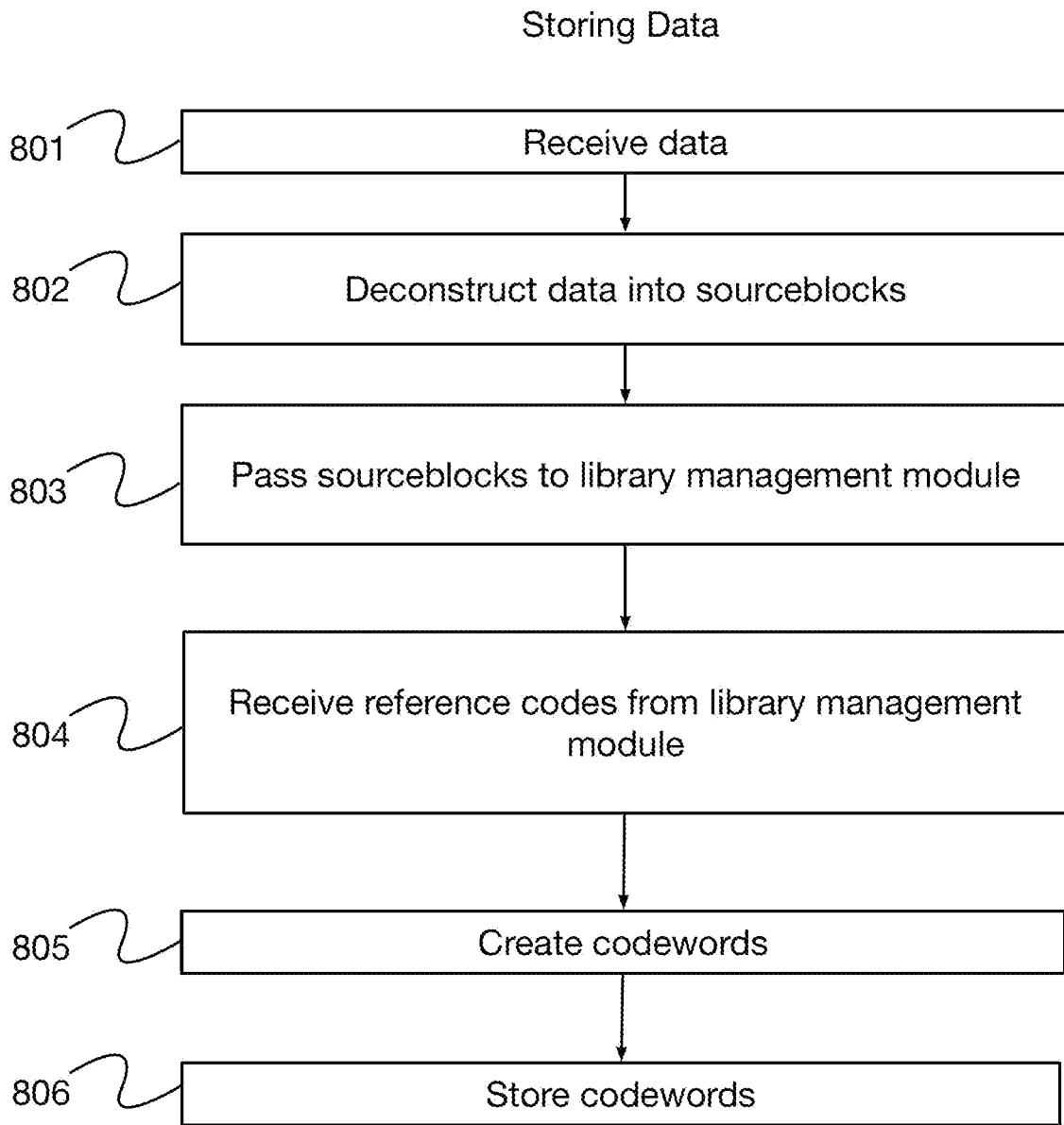
FIG. 8 is a method diagram showing the steps involved in using an embodiment to store data.

FIG. 8 is a method diagram showing the steps involved in using an embodiment 800 to store data. As data is received 801, it would be deconstructed into sourceblocks 802, and passed 803 to the library management module for processing. Reference codes would be received back 804 from the library management module, and could be combined with location information to create codewords 805, which would then be stored 806 as representations of the original data.

Figure 9:
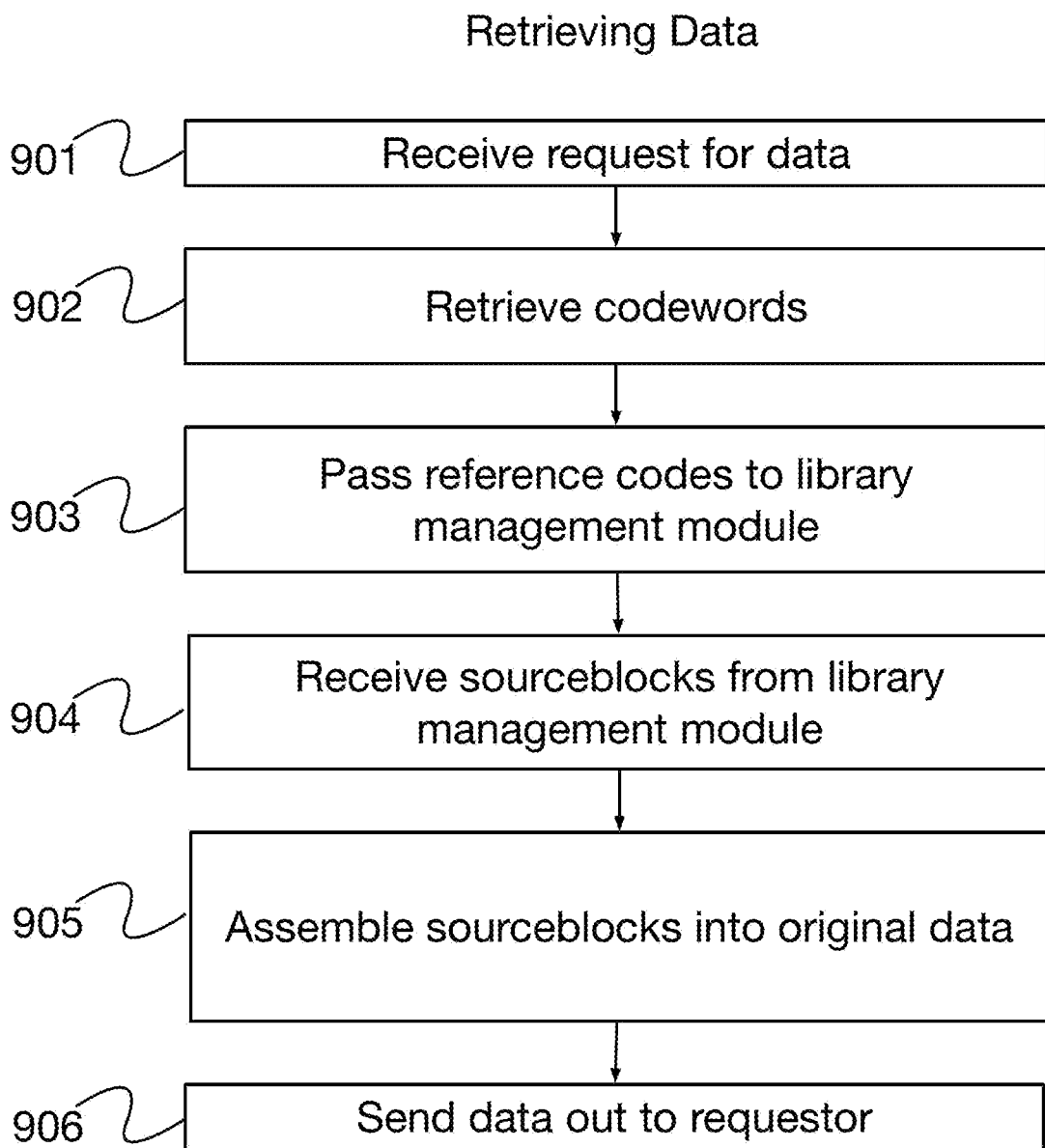
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
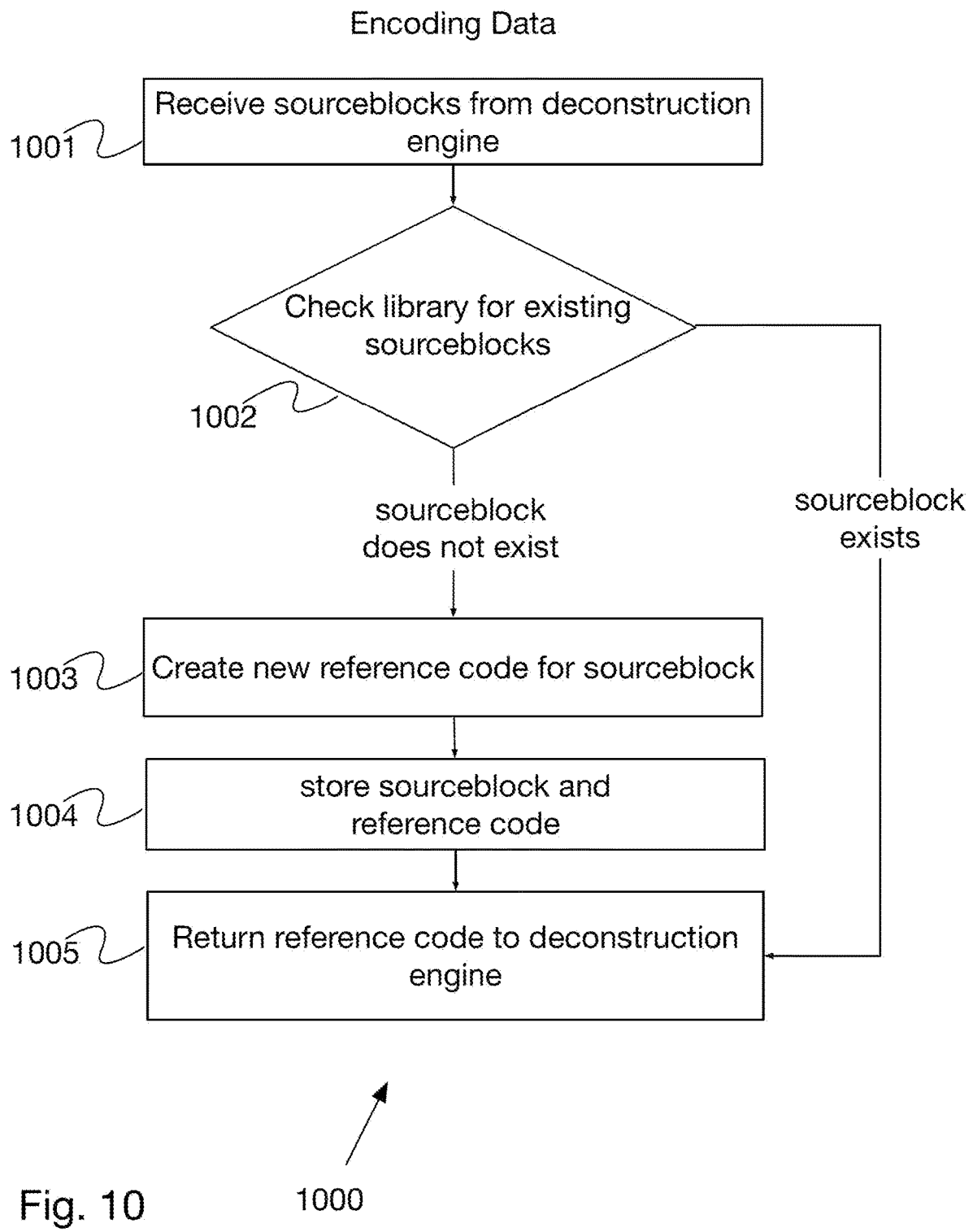
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
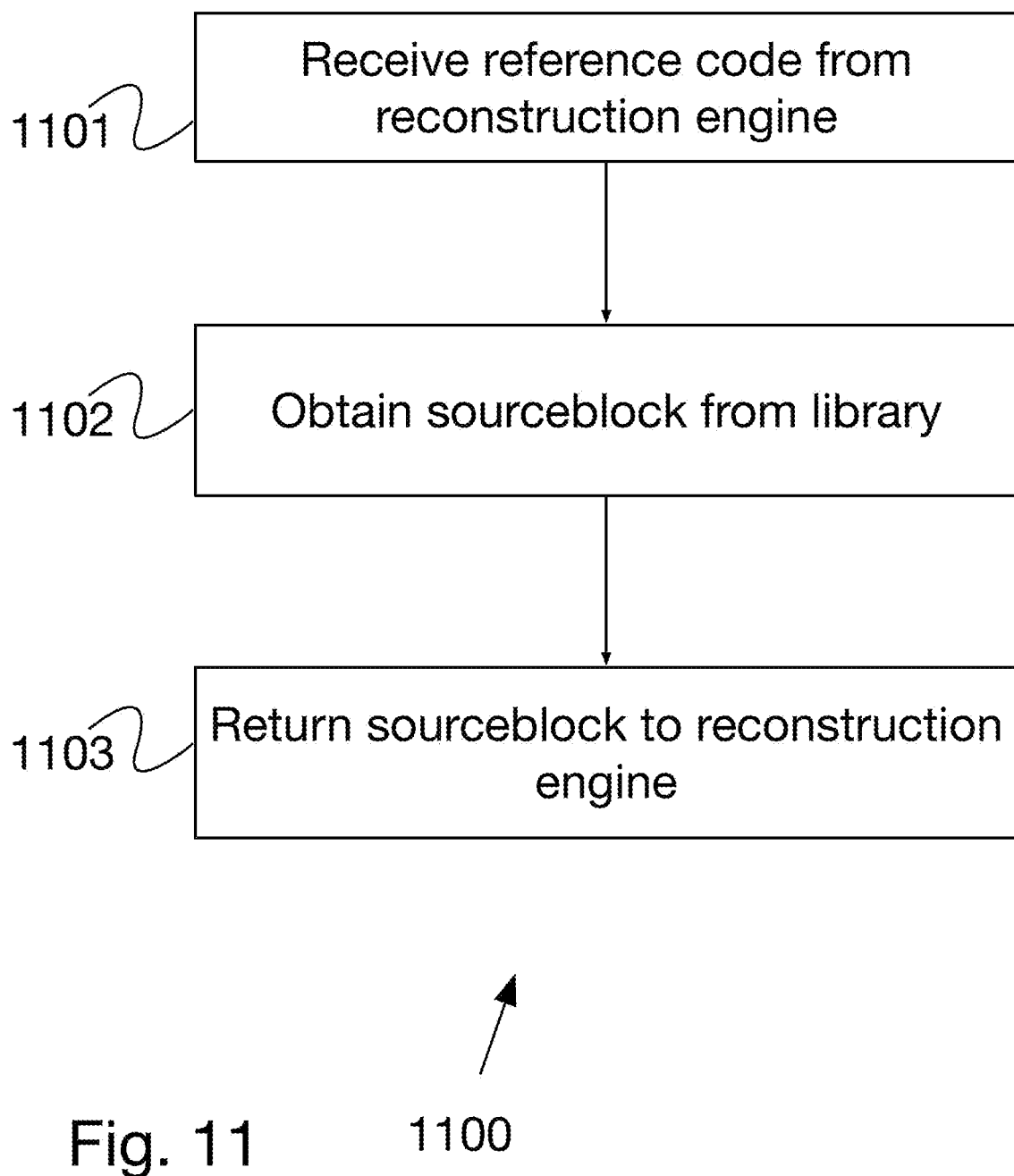
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
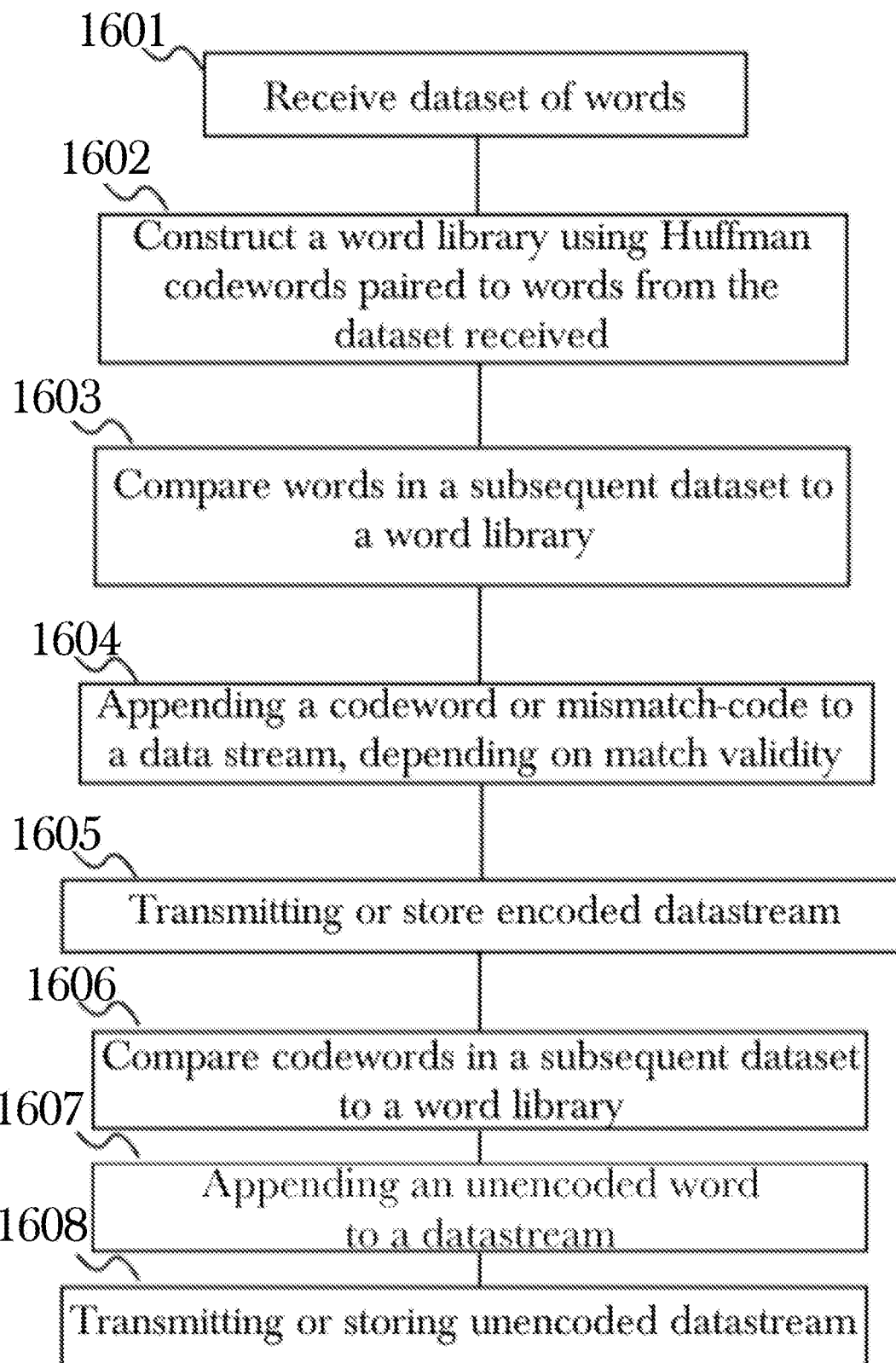
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received, and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
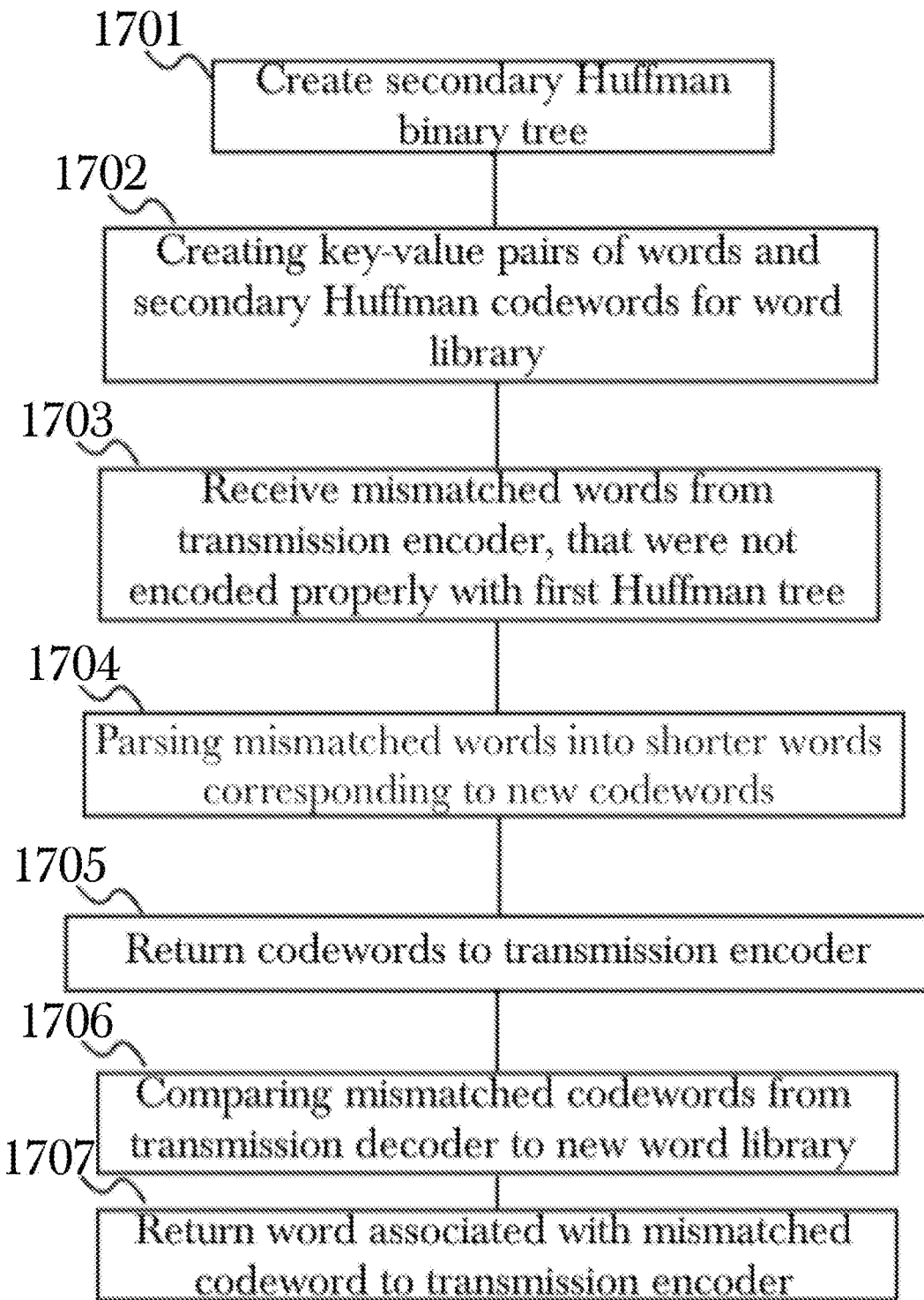
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
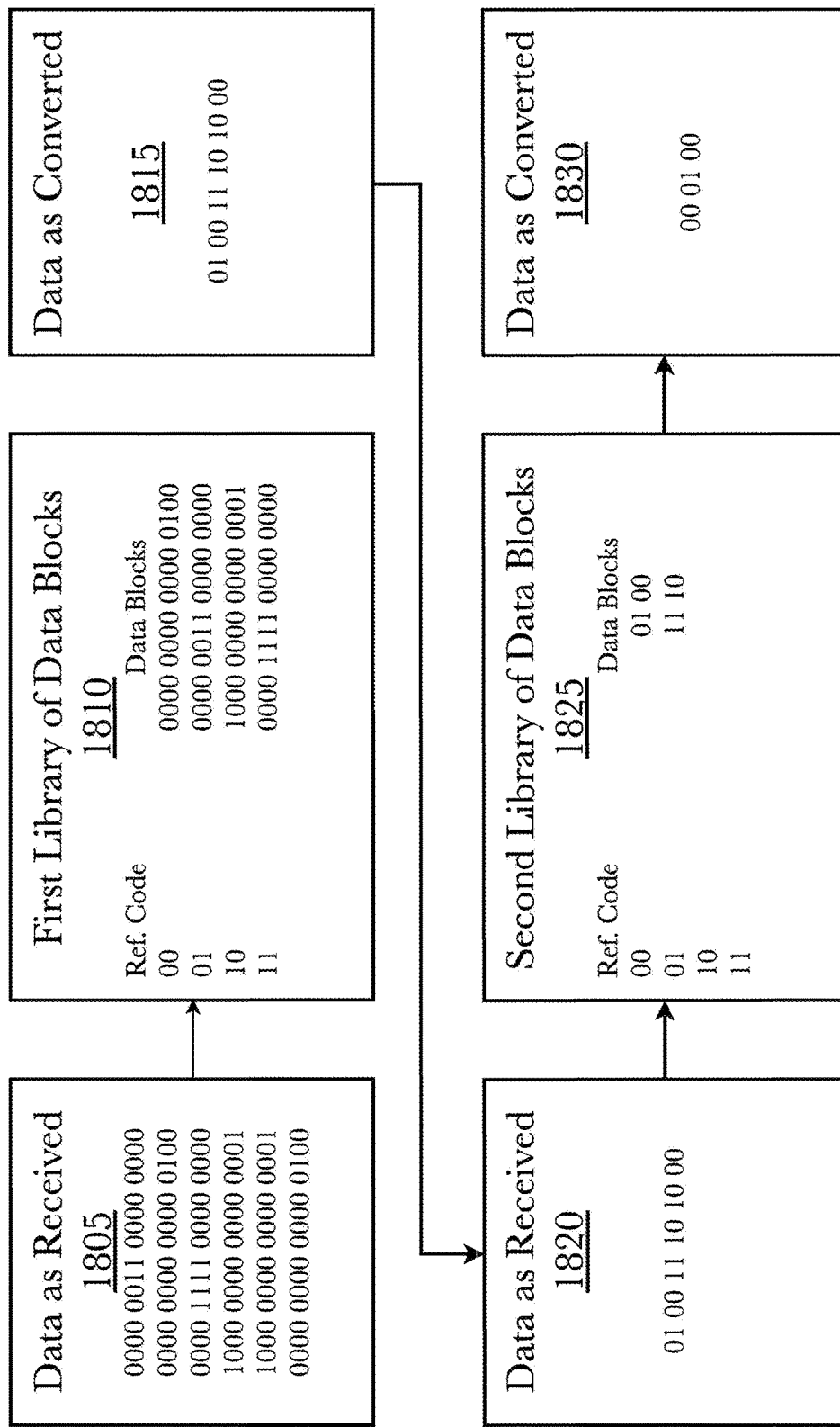
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
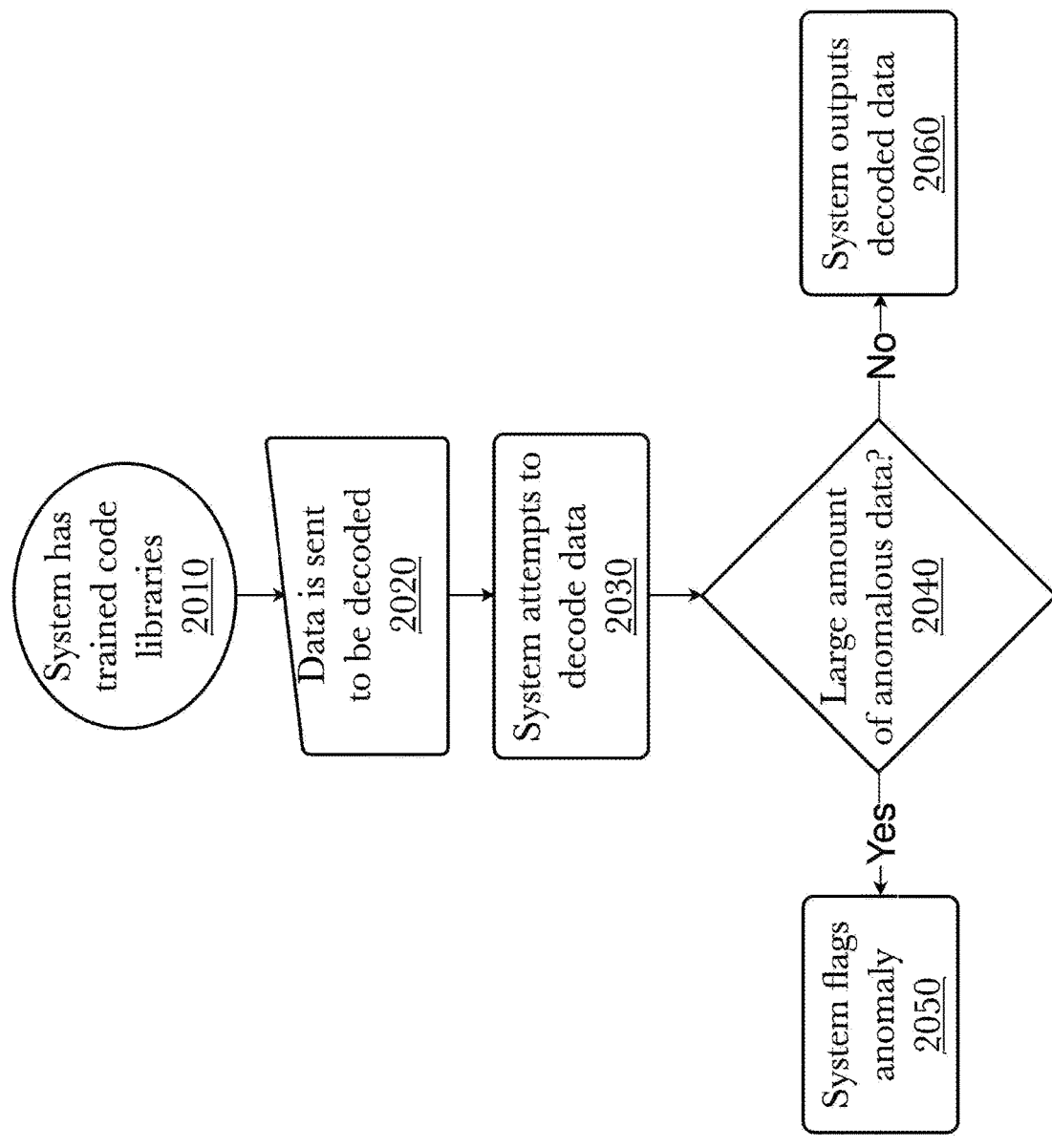
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large number of invalid references or unencoded data are not present in the encoded data that is attempting to be decoded, the data may be decoded and output as normal 2060, indicating no anomaly has been detected.

Figure 21:
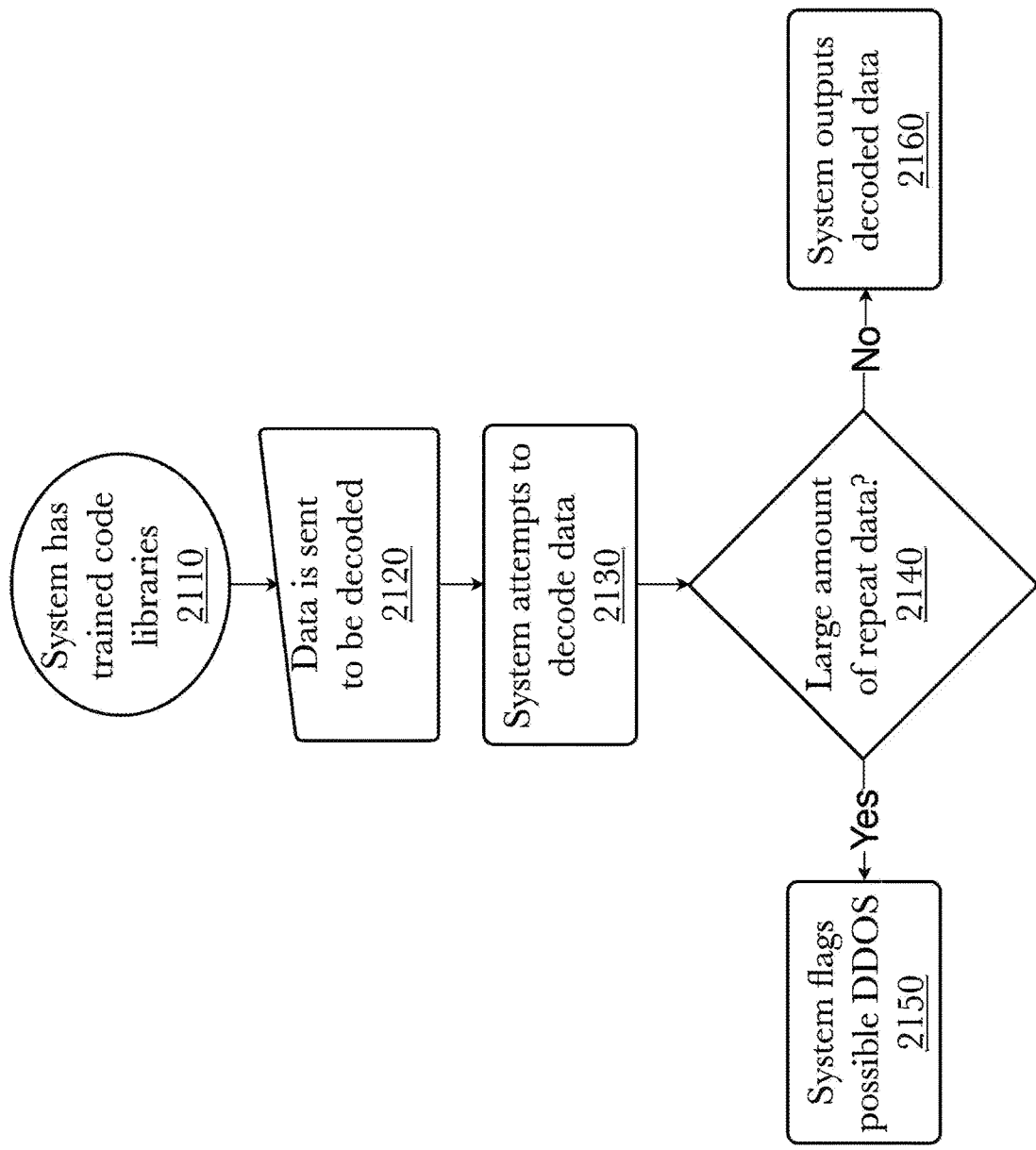
FIG. 21 is a flow diagram of a data encoding system used for Distributed Denial of Service (DDOS) attack denial.

FIG. 21 is a flow diagram of a method used for Distributed Denial of Service (DDOS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDOS detector 1920 may be configured to detect a large amount of repeating data 2140 in the encoded data, by locating data or references that repeat many times over (the number of which can be configured by a user or administrator as need be), indicating a possible DDOS attack. A flag or warning is set by the system 2150, allowing a user to be warned at least of the presence of a possible DDOS attack, including characteristics about the data and source that initiated the flag, allowing a user to then block incoming data from that source. However, if a large amount of repeat data in a short span of time is not detected, the data may be decoded and output as normal 2160, indicating no DDOS attack has been detected.

Figure 23:
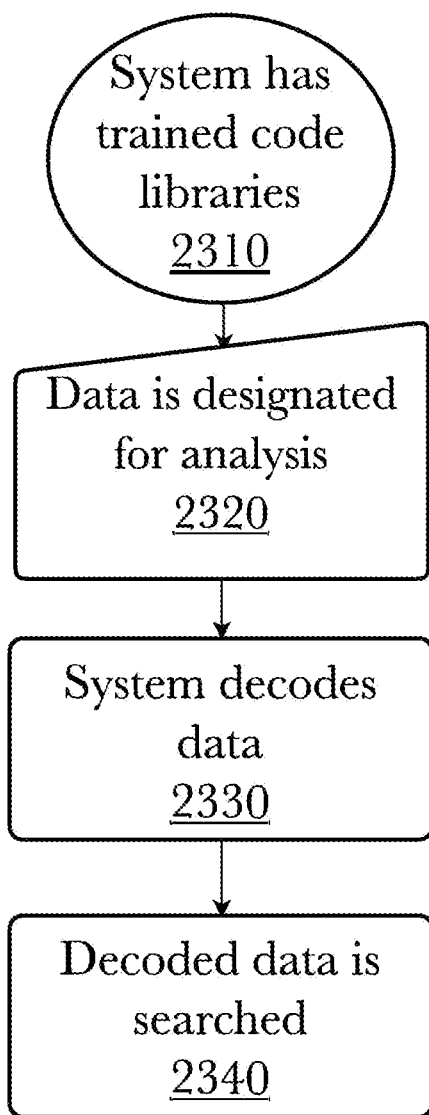
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
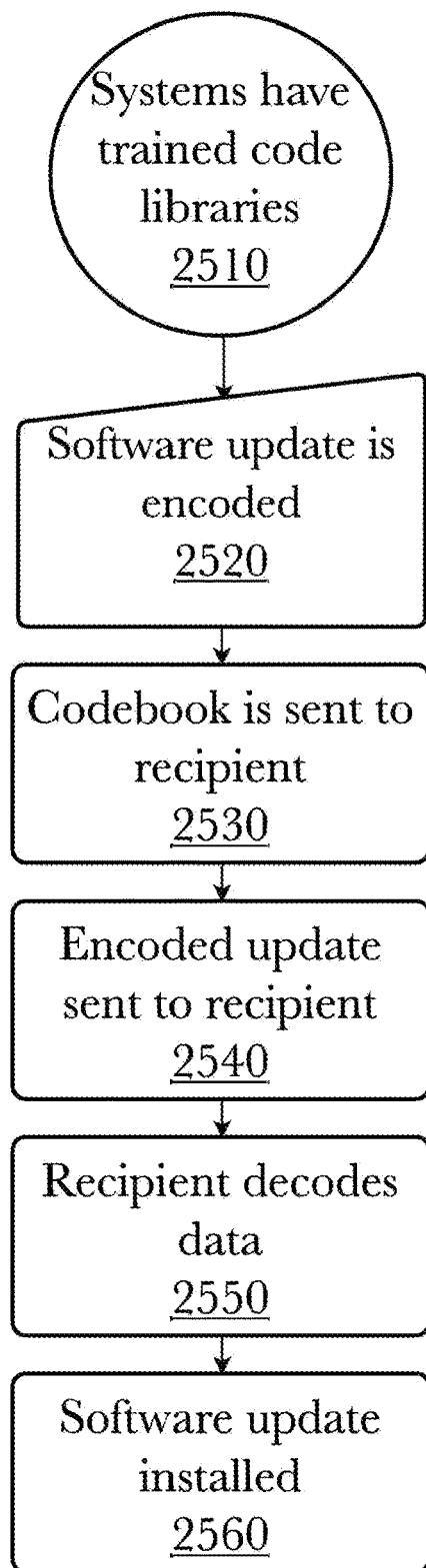
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
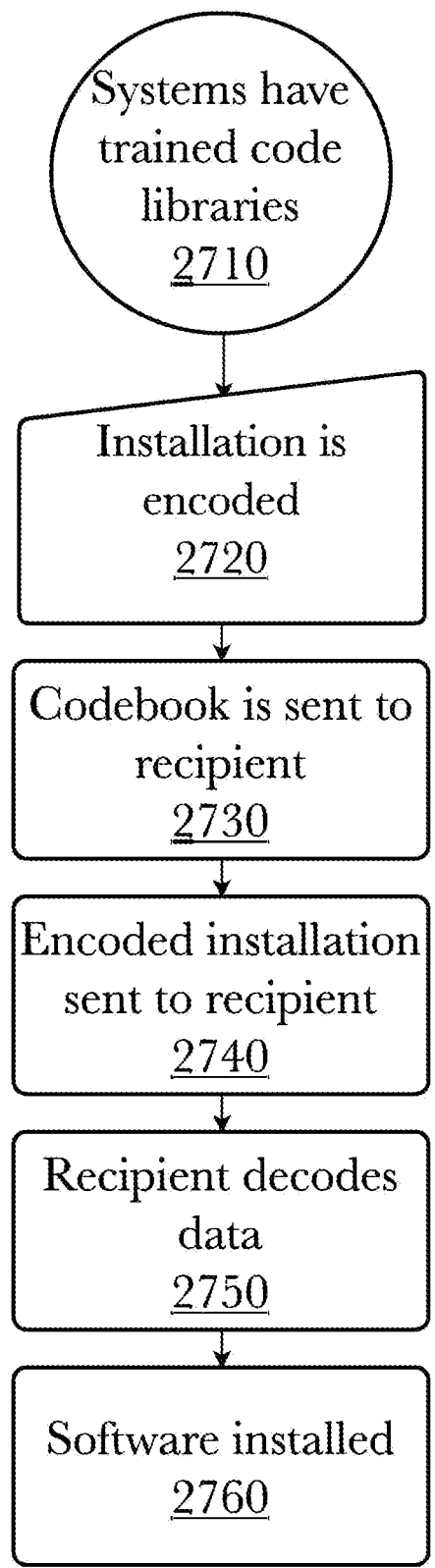
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 30:
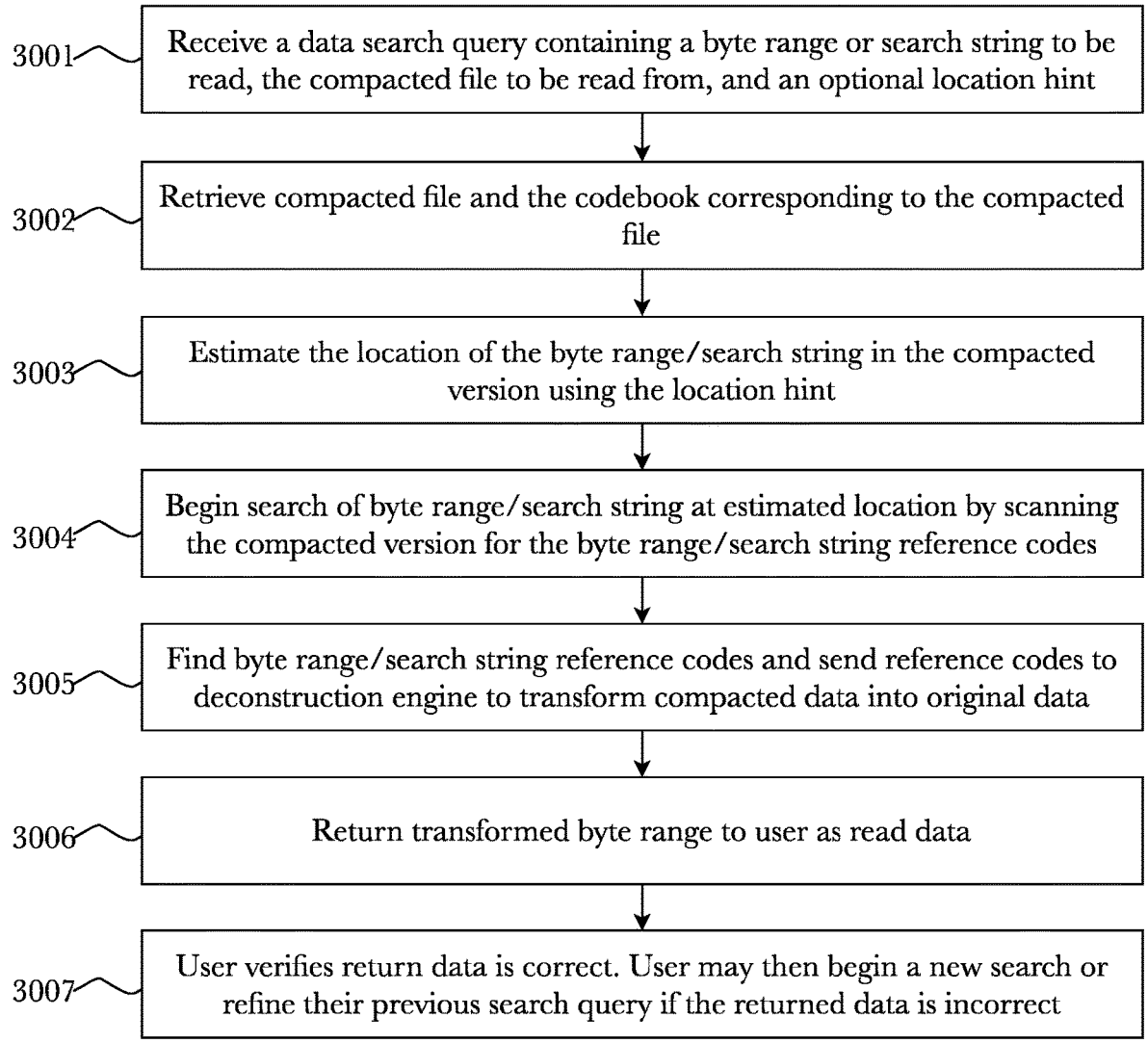
FIG. 30 is a flow diagram of an exemplary method used to search and read data from a compacted data file.

FIG. 30 is a flow diagram of an exemplary method used to search and read data from a compacted data file. For the purposes of this example drawing only, the original file is an ASCII (text) file, however, it should be understood that this method is applicable across a broad range of data types and formats. A data search query comprising a byte range or search string to be searched for and read, a compacted file to be read from, and an optional location hint from which to begin the search 3001 is received by the system. The data search query is parsed and both the compacted data file and its corresponding codebook is retrieved 3002. If a location hint was provided in the data read query, then an estimated location within the compacted version is generated using the location hint 3003. The location hint may include, but is not limited to a single byte location, a guess such as "start at the 60% mark", and a search operator such as (e.g., "near", "not", etc.). The next step begins to search for the byte range/search word at the estimated location by scanning the compacted version for the byte range/search string reference codes 3004. This step may find the starting bit location that corresponds with the beginning of the search term (i.e., byte range, search string) and retrieve a plurality of bits beginning with the starting bit, the plurality of bits represent the compacted version of the search term. The search may be done via a binary search starting from the estimated location. The search step may further involve in generating at least one or more possible sets of encodings for the search string, creating a search pair by concatenating encodings from the same set, and then searching for the search pair within the compacted data file. Once the byte range/search string has been located, its reference codes are sent to a deconstruction engine to transform the compacted data into its original form 3005. The transformed data is returned to the user as read data 3006. The user may then verify that the returned data is correct and can begin a new query process 3007.

Figure 31:
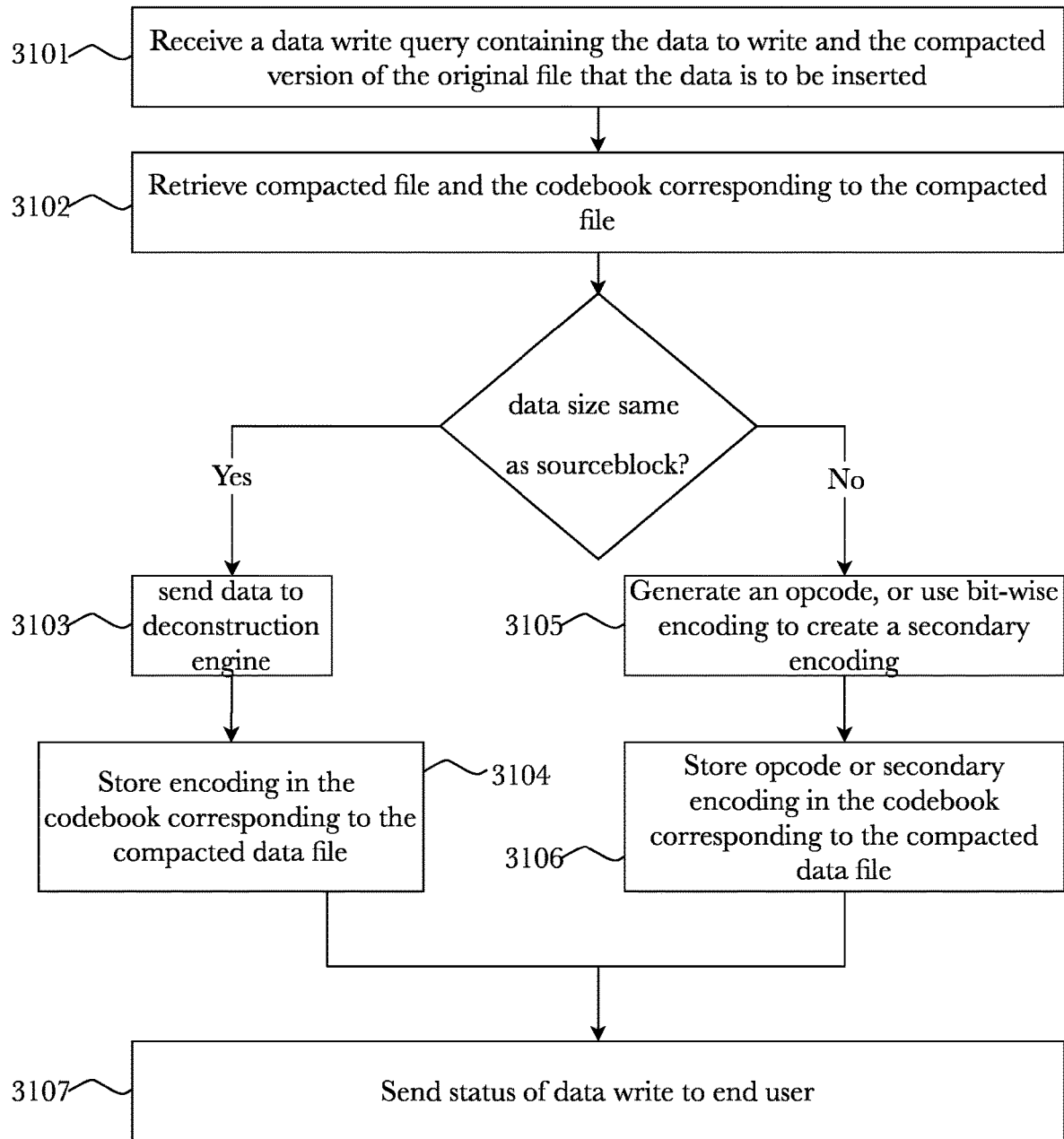
FIG. 31 is a flow diagram of an exemplary method used to write data to a compacted data file.

FIG. 31 is a flow diagram of an exemplary method used to write data to a compacted data file. The process begins when a data write query is received by the system, the data write query may be comprised of a write term (data to write) and an identified compacted data file that the write term is to be inserted into 3101. Then, the identified compacted data file and the codebook corresponding to the compacted data file is retrieved 3102. Next, the length of the write term to be inserted is checked and compared against the length of the sourceblock. If the data is the same size as the sourceblock then it can simply be encoded 3103 and stored within the codebook corresponding to the compacted data file 3104. If the data is not the same size as the sourceblock, then the system may generate an opcode or use bit-wise encoding to create a secondary encoding 3105. Writing a data file that is larger than the sourceblock can modify the output of codewords globally. To counter this, an opcode may be generated that accounts for the newly inserted data. The opcode can alert the decoder to apply an offset when decoding, thus accounting for the insertion of data into the original data file. In another embodiment, instead of using an opcode, unused bits in the codebook are used to indicate a secondary encoding. A secondary encoding indicates that data was inserted into a file, and that at the next location there are two or more possible encodings. If such a bit is encountered it means there is a secondary encoding coming up, and the encoder can switch to secondary encoding, encode one fewer byte, and then resume encoding as before. In this way there is no need to apply an offset, just use existing extra bits to create secondary encodings which prevents having to re-encode the entire original file including the inserted data. The generated opcode or the encoded bits are stored within the codebook corresponding to the compacted data file 3106. A confirmation of a successful data write process is sent to the end user 3107.

Figure 32:
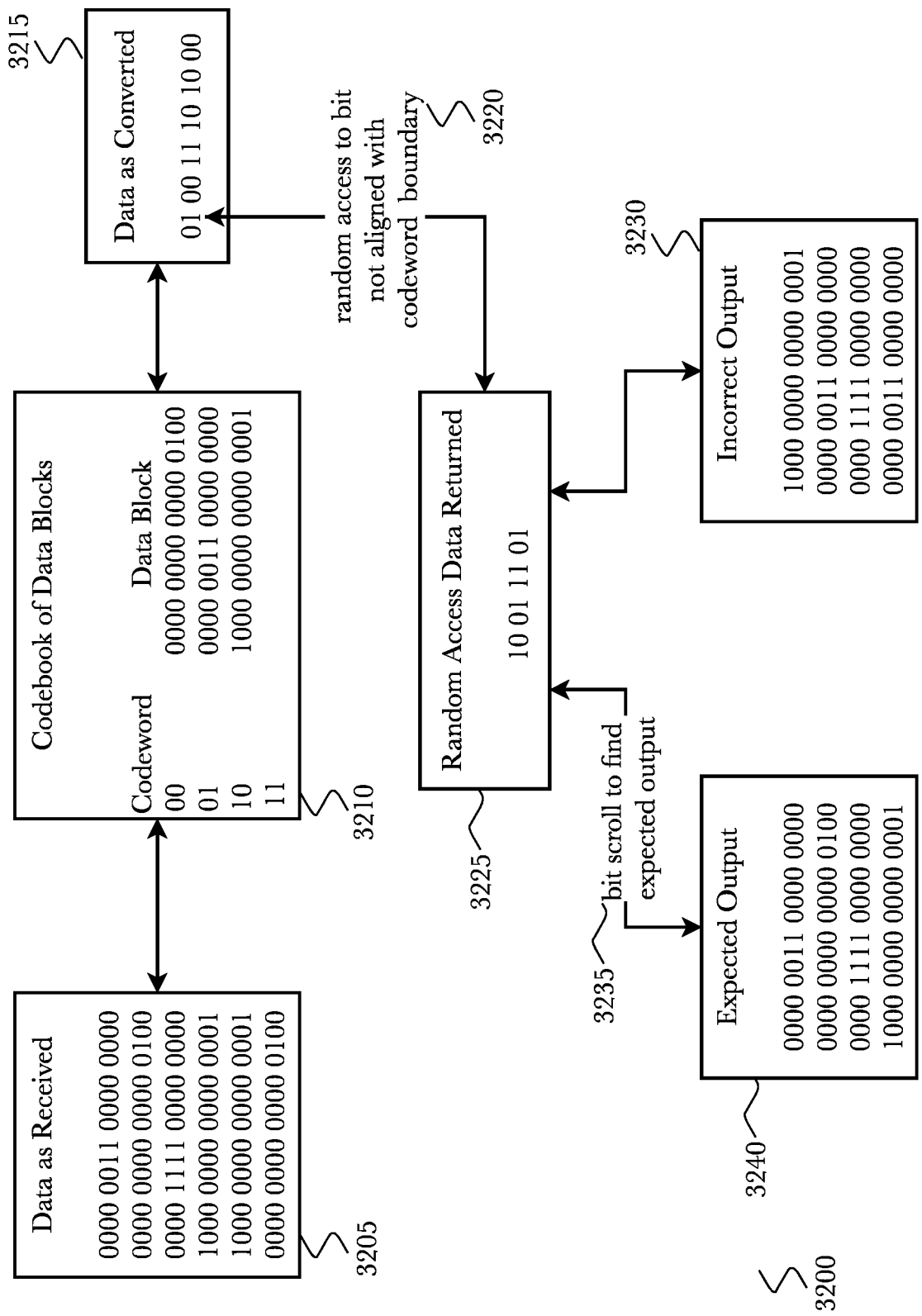
FIG. 32 is a diagram showing an example of how data might be converted into reference codes, how the converted data randomly accessed may result in incorrect output, and how correct data may be located, according to an embodiment.

FIG. 32 is a diagram showing an example of how data might be converted into reference codes, how the converted data randomly accessed may result in incorrect output, and how correct data may be located, according to an embodiment 3200. As data is received 3205, it is read by the processor in sourceblocks of a size dynamically determined by the previously disclosed sourceblock size optimizer 410. In this example, each sourceblock is 16 bits in length, and the codebook 3210 initially contains three sourceblocks with codewords 00, 01, and 10. The entry for codeword 11 is initially empty. As each 16 bit sourceblock is received, it is compared with the codebook. If that sourceblock is already contained in the codebook, it is assigned the corresponding codeword. So, for example, as the first line of data (0000 0011 0000 0000) is received, it is assigned the codeword (01) associated with that sourceblock in the codebook. If that sourceblock is not already contained in the codebook, as is the case with the third line of data (0000 1111 0000 0000) received in the example, that sourceblock is added to the codebook and assigned a codeword, in this case 11. The data is thus converted 3215 to a series of codewords to sourceblocks in the codebook. The data is stored as a collection of codewords, each of which contains the codeword to a sourceblock and information about the location of the sourceblocks in the data set. Reconstructing the data is performed by reversing the process. Each stored codeword in a data collection is compared with the codewords in the codebook, the corresponding sourceblock is read from the codebook, and the data is reconstructed into its original form.

A data search query specifying a search term to read from the original data set. In this example, the selected search term captures to the first four lines of the data as received 3205. The system estimates a bit location N' in the converted data set that corresponds to byte N in the original data set. The estimated location, bit N', may not be aligned with a codeword boundary 3220. In this example, the first codeword that should be accessed and returned is supposed to be 01, but the estimate N' location puts the pointer at the last bit in the codeword 3220. When N' is not aligned with a codeword boundary, the system will start decoding in the middle of a codeword, resulting in returned data 3225 that when decoded leads to incorrect output 3230. Due to the boundary misalignment, the random access data returned is 10 01 11 01 3225, when the correct random access data returned should have been 01 00 11 10. The user that submits the data search query will receive the incorrect output and recognize it as garbage output. The user can manually bit scroll 3235 forward and backward from N' until a codeword boundary is found and the expected output 3240 corresponding to the search term is returned.

In another embodiment, mile markers are stored in a file accompanying the compacted data set with a list of exact locations N' in the compacted data set that correspond to N=100, 200, 1000, etc. The mile marker file enables more refined estimates of N' with less seeking necessary as now the user may seek forwards and backwards in the compacted data set in codeword increments and boundary alignment is automatic. These mile markers (i.e., locations) might denote which bit corresponds to the $1000^{th}$ byte from the unencoded data, which bit corresponds to the $2000^{th}$ byte, etc. The use of mile markers prevents the possibility of starting the data read process in the middle of codeword as any search may begin at the nearest mile marker bit associated with byte N.

Figure 33:
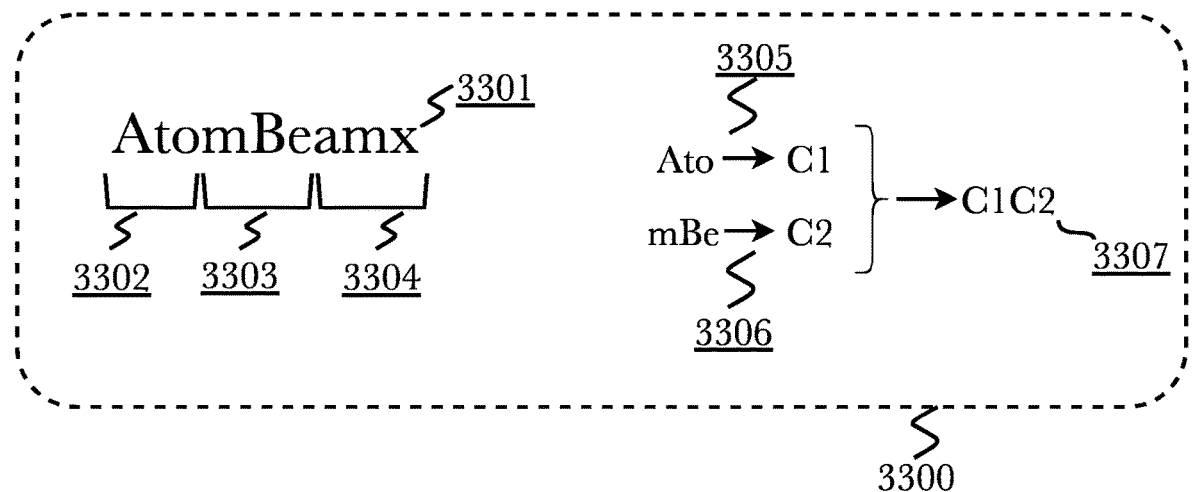
FIG. 33 is a diagram showing an exemplary process of parsing a search string using multiple encodings, according to an embodiment.
Figure 33:
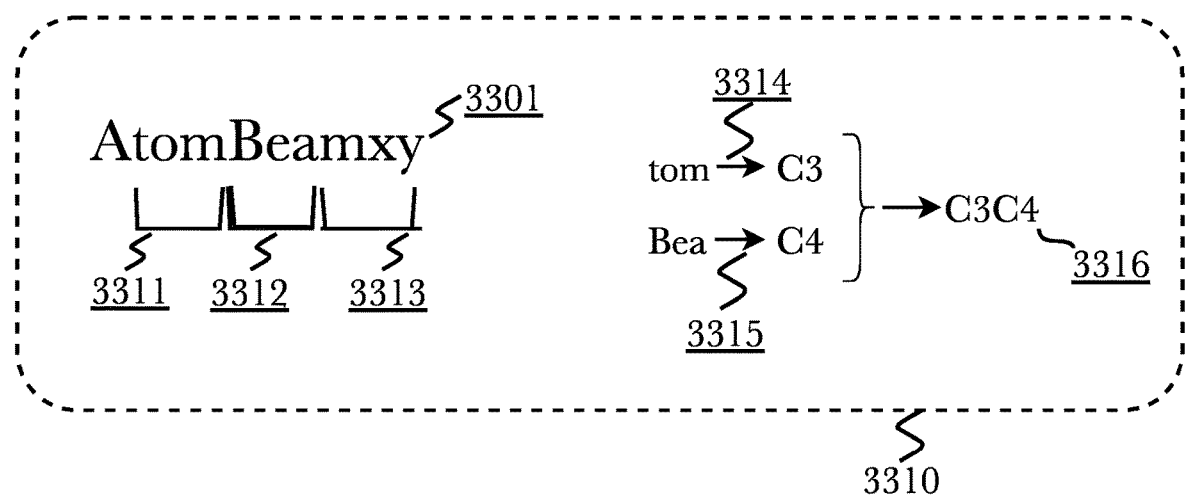
Figure 33:
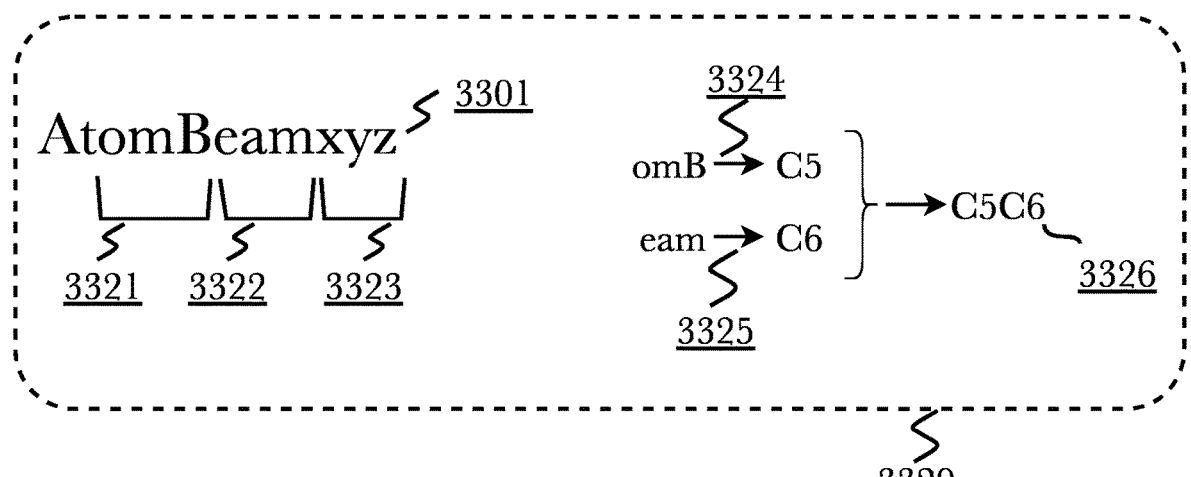

FIG. 33 is a diagram showing an exemplary process of parsing a search term using multiple encodings, according to an embodiment. In this example, the search term is a search string. The original data file was divided into sourceblocks, and the size of these sourceblocks are referred to as the sourceblock length. A search string may be reasonably long compared to the sourceblock length, such as two or three times the sourceblock length. There may be multiple possible encodings of the search string that occur, because the sourceblock might not be aligned to a boundary of the search string. For example, the if the search string was "AtomBeam" 3301 and the sourceblock length is three bytes, there may be three separate encodings 3300, 3310, 3320 of the search string. The first encoding 3300 of the search string may be "Ato" 3302, "mBe" 3303, and "amx" 3304 where "x" is something that is not relevant to the search string. The second encoding 3310 may be "tom" 3311, "Bea" 3312, and "mxy" 3313 where "x" and "y" are not relevant to the search string. The third 3320 encoding may be "omB" 3321, "eam"3322, and "xyz" 3323 where "xyz" is not relevant to the search string. The data search engine 2940 may generate the encoding for each search string using the codebook corresponding to the compacted data file to assign a codeword to each sourceblock.

The compacted data file may then be searched for occurrences of the assigned codeword(s). For example, the "Ato" 3302 and "mBe" 3303 sourceblocks may each be encoded with codewords C1 3305 and C2 3306 respectively. These sourceblocks 3302, 3303 were selected because they both contain only data that is part of the search string 3301 and do not contain non relevant data (e.g., "x", "xy" "xyz" from preceding paragraph). The assigned codewords may be concatenated to form a codeword double (pair) C1C2 3307 and then the search engine 2940 may perform a search for codeword pair C1C2 3307 in the compacted data. This process is done for each of the possible encodings 3300, 3310, 3320 of the search string 3301.

From encoding two 3310 sourceblocks containing "tom" 3311 and "Bea" 3312 are assigned a codeword such as C3 3314 and C4 3315. These codewords may be concatenated to form a codeword pair C3C4 3316 and then the search engine 2940 may perform a search for the codeword pair C1C2 3316 in the compacted data file. Likewise, from encoding three 3320 sourceblocks containing "omB" 3321 and "eam" 3322 are assigned a codeword such as C5 3324 and C6 3325. These codewords may be concatenated to form a codeword pair C5C6 3326 and then the search engine 2940 may perform a search for the codeword pair C5C6 3326 in the compacted data file. Each of the codeword pairs C1C2 3307, C3C4 3316, and C5C6 3326 form three new search strings and the data search engine 2940 may scan through the compacted data file looking for all three of them. If any of them are found, then the codewords in the compacted data file to the left and right of the found codeword pair may be decoded to identify if the correct letter (byte) is preceding or following the codeword pair. In this example, two source blocks were used to create a codeword pair, however, it should be appreciated that number of sourceblocks concatenated is dependent upon the length of the search term and the sourceblock length. There may be codeword triples, codeword quadruples, etc., as any codeword n-tuple may be possible due to the above mentioned dependencies.

For example, if the search results return "tomBea" that means an occurrence of codeword pair C3C4 3316 was found. The search engine 2940 may decode one letter to the left side and check if it is "A" and one letter to the right to check if is "m". If those are the letters found the search string has been located, if not then it is not the correct string and the scan continues through the compacted data file until another occurrence of any one of the codeword pairs 3307, 3316, or 3326 is found. The data search engine 2940 performs this process automatically until the search string has been located or the entire compacted data file has been scanned and searched.

Exemplary Computing Environment

Figure 37:
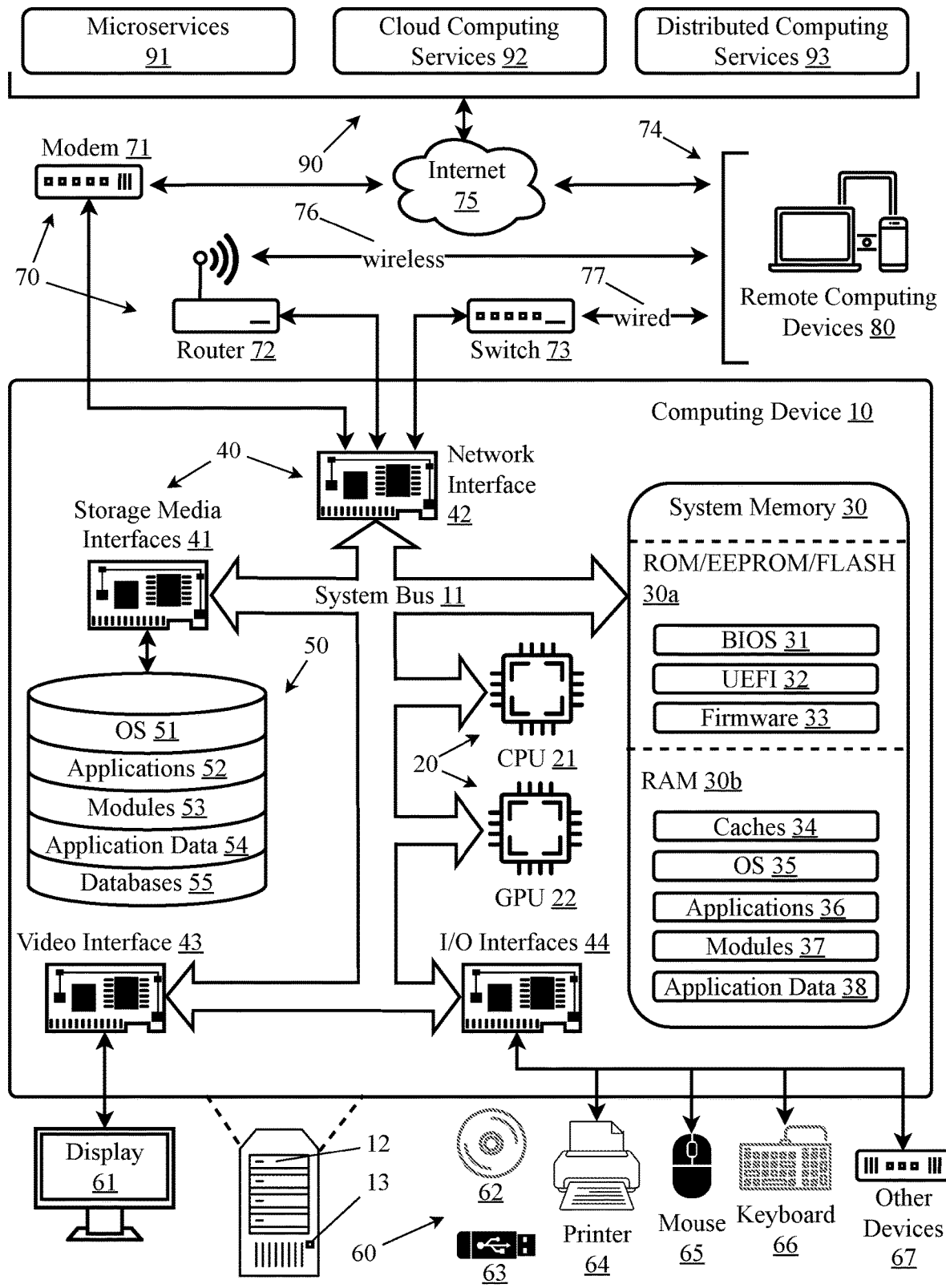
FIG. 37 illustrates an exemplary computing environment on which an embodiment described herein may be implemented, in full or in part.

FIG. 37 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IOT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller each e memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for random-access manipulation of a compacted data file, comprising:
    a computing device comprising a memory, a processor, and a non-volatile data storage device;
    a random access engine comprising a first plurality of programming instructions that, when operating on the processor, cause the computing device to:
        receive a data search query, the data search query being directed to the compacted data file, wherein the compacted file is compacted using a reference codebook;
        organize the reference codebook into a hierarchical representation;
        traverse the hierarchical representation until a start codeword corresponding to the beginning of the data search query is identified; and
        send the start codeword and a plurality of immediately following codewords from the compacted data file to a decoder; and
    an estimator module comprising a third plurality of programming instructions that, when operating on the processor, cause the computing device to:
        estimate a first starting bit location in the compacted data file;
        refine the first starting bit location by:
            determining a plurality of codeword boundaries by performing distinct value estimation on the compacted data file, wherein the distinct value estimates correspond to a codeword boundary; and
            determining whether a bit sequence starting at the first starting bit location corresponds to a codeword boundary of the plurality of codeword boundaries and, if not, traversing the hierarchical representation until a codeword boundary is located at a new starting bit.

2. The system of claim 1, further comprising a deconstruction engine comprising a second plurality of programming instructions that, when operating on the processor, cause the computing device to:
- deconstruct a data stream into a plurality of data sourceblocks;
- create the compacted data file by compacting the plurality of data sourceblocks using the reference codebook; and
- send the reference codebook to the random access engine.

3. The system of claim 1, wherein the estimator module sends the codeword boundary estimate to the random access engine.

4. The system of claim 3, wherein the random access engine uses the codeword boundary estimate as an initial point to begin traversing the hierarchical representation.

5. A method for random-access manipulation of a compacted data file, comprising the steps of:
- receiving a data search query, the data search query being directed to the compacted data file, wherein the compacted file is compacted using a reference codebook;
- organizing the reference codebook into a hierarchical representation;
- traversing the hierarchical representation until a start codeword corresponding to the beginning of the data search query is identified; and
- sending the start codeword and a plurality of immediately following codewords from the compacted data file to a decoder;
- estimating, using an estimator module, a first starting bit location in the compacted data file; and
- refining the first starting bit location by:
- determining a plurality of codeword boundaries by performing distinct value estimation on the compacted data file, wherein the distinct value estimates correspond to a codeword boundary; and
- determining whether a bit sequence starting at the first starting bit location corresponds to a codeword boundary of the plurality of codeword boundaries and, if not, traversing the hierarchical representation until a codeword boundary is located at a new starting bit.

6. The method of claim 5, further comprising the steps of:
- deconstructing a data stream into a plurality of data sourceblocks;
- creating the compacted data file by compacting the plurality of data sourceblocks using the reference codebook; and
- sending the reference codebook to the random access engine.

7. The method of claim 5, wherein the codeword boundary estimate is used as an initial point to begin traversing the hierarchical representation.

* * * * *